United States Patent
Kasichainula

(10) Patent No.: US 12,250,163 B2
(45) Date of Patent: Mar. 11, 2025

(54) DETERMINISTIC PACKET SCHEDULING AND DMA FOR TIME SENSITIVE NETWORKING

(71) Applicant: Intel Corporation, Santa Clara, CA (US)

(72) Inventor: Kishore Kasichainula, Phoenix, AZ (US)

(73) Assignee: Intel Corporation, Santa Clara, CA (US)

(*) Notice: Subject to any disclaimer, the term of this patent is extended or adjusted under 35 U.S.C. 154(b) by 356 days.

(21) Appl. No.: 17/033,722

(22) Filed: Sep. 26, 2020

(65) Prior Publication Data
US 2021/0014177 A1  Jan. 14, 2021

(51) Int. Cl.
*H04L 12/879* (2013.01)
*G06F 13/28* (2006.01)
(Continued)

(52) U.S. Cl.
CPC ............ *H04L 49/901* (2013.01); *G06F 13/28* (2013.01); *H04L 12/4641* (2013.01); *H04L 47/2441* (2013.01); *H04L 47/625* (2013.01)

(58) Field of Classification Search
CPC .... G06F 13/28; G06F 15/17331; G06F 13/16; G06F 13/126; G06F 13/1652; G06F 13/1642; G06F 13/22; G06F 12/145; G06F 13/1605; G06F 15/17375; G06F 9/45558; G06F 12/1081; G06F 13/385;
(Continued)

(56) References Cited

U.S. PATENT DOCUMENTS 6,956,818 B1* 10/2005 Thodiyil ................. H04L 47/50
  370/395.42
7,620,748 B1* 11/2009 Bruce ..................... G06F 13/28
  710/308
(Continued)

FOREIGN PATENT DOCUMENTS

JP       4636583 B2 *  2/2011  ............. H04L 47/24

OTHER PUBLICATIONS

EPO; Office Action issued in European Patent Application No. EP 21182578.1, dated Oct. 5, 2023; 4 pages.
(Continued)

*Primary Examiner* — Wutchung Chu
(74) *Attorney, Agent, or Firm* — Alliance IP, LLC

(57) ABSTRACT

In one embodiment, a network interface controller (NIC) includes multiple packet transmission queues to queue data packets for transmission. The data packets are assigned to multiple traffic classes. The NIC also includes multiple input/output (I/O) interfaces for retrieving the data packets from memory. Each I/O interface is assigned to a subset of the traffic classes. The NIC also includes scheduler circuitry to select a first data packet to be retrieved from memory, and direct memory access (DMA) engine circuitry to retrieve the first data packet from memory via one of the I/O interfaces based on the traffic class of the first data packet, and store the first data packet in one of the packet transmission queues. The NIC also includes a transmission interface to transmit the first data packet over a network at a corresponding launch time indicated by the scheduler circuitry.

18 Claims, 13 Drawing Sheets

(51) Int. Cl.
*H04L 12/46* (2006.01)
*H04L 47/2441* (2022.01)
*H04L 47/625* (2022.01)
*H04L 49/901* (2022.01)

(58) Field of Classification Search
CPC ...... G06F 13/24; G06F 13/30; G06F 13/4022; G06F 13/1668; G06F 13/4027; G06F 12/0835; G06F 13/128; H04L 12/4641; H04L 47/625; H04L 47/6295; H04L 49/901; H04L 47/2441; H04L 12/4645; H04L 47/564; H04L 47/6215; H04L 47/24; H04L 43/18; H04L 41/5003; H04L 47/522; H04L 47/11; H04L 43/028; H04L 47/781; H04L 49/25; H04L 47/10; H04L 47/115; H04L 49/90; H04L 67/1097; H04L 29/06; H04L 12/5601; H04L 49/351; H04L 47/28; H04L 47/6275; H04L 49/9068; H04W 28/14

See application file for complete search history.

(56) References Cited

U.S. PATENT DOCUMENTS

| | | | | |
|---|---|---|---|---|
| 7,877,524 | B1* | 1/2011 | Annem | G06F 13/28 710/22 |
| 8,001,285 | B1* | 8/2011 | Bar-Shalom | G06F 13/385 712/225 |
| 8,271,700 | B1* | 9/2012 | Annem | G06F 13/28 710/22 |
| 9,053,093 | B1* | 6/2015 | Nguyen | G06F 12/1081 |
| 9,916,269 | B1* | 3/2018 | Machulsky | G06F 13/4068 |
| 9,952,991 | B1* | 4/2018 | Bruce | G06F 13/28 |
| 9,959,227 | B1* | 5/2018 | Diamant | G06F 13/28 |
| 10,853,308 | B1* | 12/2020 | Subramanian | G06F 15/17331 |
| 10,915,478 | B2* | 2/2021 | Chafin | G06F 13/28 |
| 11,159,445 | B1* | 10/2021 | Subramanian | H04L 47/2416 |
| 11,494,326 | B1* | 11/2022 | Xu | G06N 3/06 |
| 2004/0062246 | A1 | 4/2004 | Boucher et al. | |
| 2007/0070901 | A1* | 3/2007 | Aloni | H04L 69/12 370/392 |
| 2007/0174511 | A1* | 7/2007 | Yu | G06F 13/28 710/36 |
| 2008/0270563 | A1* | 10/2008 | Blocksome | H04L 67/1097 709/212 |
| 2014/0365705 | A1* | 12/2014 | Tanaka | G06F 13/362 710/308 |
| 2015/0127869 | A1* | 5/2015 | Srinivasan | H04L 67/1097 710/308 |
| 2016/0006579 | A1* | 1/2016 | Lamb | H04L 12/4625 370/254 |
| 2016/0006580 | A1* | 1/2016 | Lamb | H04L 45/745 370/254 |
| 2017/0364707 | A1* | 12/2017 | Lal | G06F 21/57 |
| 2019/0121781 | A1* | 4/2019 | Kasichainula | G06F 15/17331 |
| 2019/0243781 | A1* | 8/2019 | Thyamagondlu | G06F 13/28 |
| 2019/0280991 | A1* | 9/2019 | Singh | H04L 47/6215 |
| 2020/0296050 | A1* | 9/2020 | Oge | H04L 47/625 |
| 2021/0099391 | A1* | 4/2021 | Masputra | H04L 47/805 |
| 2021/0263866 | A1* | 8/2021 | Norman | G06F 13/1668 |
| 2021/0320866 | A1* | 10/2021 | Le | H04L 47/115 |
| 2021/0409506 | A1* | 12/2021 | Radi | H04L 47/6215 |

OTHER PUBLICATIONS

IEEE Standard for Local and Metropolitan Area Networks; "Bridges and Bridged Networks, Amendment 25: Enhancements for Scheduled Traffic;" IEEE Std 802.1Qbv-2015; Dec. 5, 2015; New York; 57 pages.

IEEE Standard for Local and Metropolitan Area Networks; "Virtual Bridged Local Area Networks, Amendment 12: Forwarding and Queuing Enhancements for Time-Sensitive Streams;" IEEE Std. 802.1Qav-2009; Jan. 5, 2010; New York, 87 pages.

EPO; Extended European Search Report issued in EP Patent Application No. 21182578.1, dated Dec. 17, 2021; 8 pages.

EPO Communication Pursuant to Article 94(3) EPC in EP Application Serial No. 21182578.1 mailed on Aug. 30, 2024, 4 pages.

* cited by examiner

TRANSMIT DESCRIPTOR WRITE-BACK FORMAT

| b31 | b30 | ... | b1 | b0 |
|---|---|---|---|---|
| Timestamp [31:0] | | | | |
| Timestamp [63:32] | | | | |
| CTL | Launch Time Jitter (LTJ) [7:0] | | Packet Transmit Latency (PTL) [15:0] | |
| OWN | Status [30:0] | | | |

FIG. 7

TRANSACTION ID ENCODING SCHEME

| b4 | b3 | b2 | b1 | b0 |
|---|---|---|---|---|
| Channel/Queue # | | | 0: Receive (Rx)<br>1: Transmit (Tx) | 0: Descriptor<br>1: Data |

FIG. 8A

ENCODED TRANSACTIONS

| TRANSACTION ID | DESCRIPTION |
|---|---|
| 0b00000 | Channel 0 Receive Descriptor Read/Write |
| 0b00010 | Channel 0 Transmit Descriptor Read/Write |
| 0b00100 | Channel 1 Receive Descriptor Read/Write |
| 0b00110 | Channel 1 Transmit Descriptor Read/Write |
| ... | ... |
| 0b00001 | Channel 0 Receive Data Write |
| 0b00011 | Channel 0 Transmit Data Read |
| 0b00101 | Channel 1 Receive Data Write |
| 0b00111 | Channel 1 Transmit Data Read |
| ... | ... |

FIG. 8B

DETERMINISTIC PACKET SCHEDULING AND DMA FOR TIME SENSITIVE NETWORKING

FIELD OF THE SPECIFICATION

This disclosure relates in general to the field of computer networking, and more particularly, though not exclusively, to deterministic packet scheduling and DMA for time sensitive networking.

BACKGROUND

Time Sensitive Networking (TSN) refers to a set of standards that define mechanisms for time-sensitive transmission of data over a network. In some cases, however, a network interface controller (NIC) with TSN capabilities may be unable to satisfy the increasingly stringent networking requirements of many time-sensitive applications. For example, due to various design limitations, the packet scheduling and direct memory access (DMA) operations performed by the NIC can cause latency and jitter that leads to packet transmission delays.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

FIG. 7 illustrates an example of a transmit descriptor write-back format.

FIGS. 8A-B illustrate examples of a transaction encoding scheme and various encoded transactions based on that scheme.

EMBODIMENTS OF THE DISCLOSURE

Figure 1:
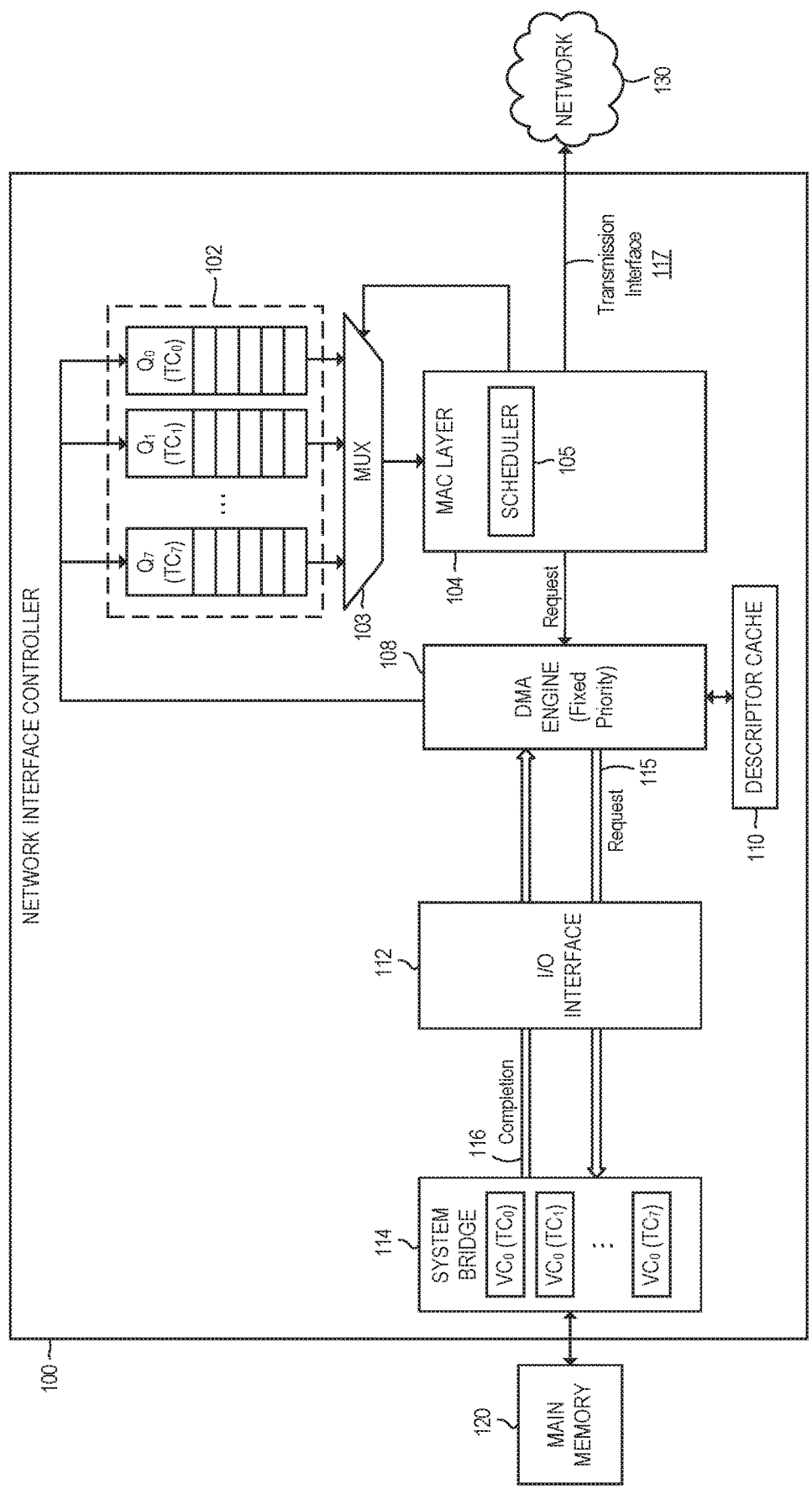
FIG. 1 illustrates an example embodiment of a network interface controller.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Introduction

The emerging IEEE standards for deterministic networking, collectively referred to as "Time Sensitive Networking" (TSN), enable transmission of time-sensitive data over a network with extremely high time precision. As a result, embedded devices in the industrial and automotive space are increasingly integrating TSN controllers to leverage the benefits of time sensitive networking. The inevitable convergence of Information Technology (IT) and Operational Technology (OT), workload consolidation, and the demand for seamless communication across many connected devices, however, are imposing increasingly stringent requirements on network performance, including higher bandwidth, shorter end-to-end latency, and hard real-time delivery requirements. In some cases, however, network interface controllers (NICs) are unable to satisfy these increasingly stringent requirements due to various design limitations.

As an example, the ability of a NIC to transmit a large burst of packets deterministically within a short period of time is limited by various factors, including the scheduling algorithm(s) employed by the NIC (e.g., as defined in various IEEE TSN standards such as IEEE 802.1Qav and IEEE 802.1Qbv), the latency and jitter associated with fetching packet descriptors and payloads from main memory via direct memory access (DMA), the burst size (the larger the burst size, the higher the latencies incurred by the NIC), and the order in which the upstream DMA read requests are sequenced, among other factors.

For example, a NIC typically uses direct memory access (DMA) operations to fetch data required for packet transmissions from main memory, such as the descriptor and the payload data for each packet. The descriptor merely contains a pointer to a memory address where the payload data for the packet is stored, while the payload data contains the actual contents of the packet. Thus, the NIC does not have knowledge of where the packet payload is stored until it fetches the descriptor, which means the descriptor must be fetched before the packet payload. As a result, a NIC typically performs at least two round-trip DMA operations for every packet transmission—one DMA operation to prefetch the descriptor and another to fetch the packet payload. The latency and jitter associated with these DMA operations, however, can lead to packet transmission delays in certain situations, particularly when transmitting large bursts of packets.

While a NIC can leverage various priority-based scheduling schemes to help ensure that packets are transmitted in a timely manner (e.g., fixed priority, weighted strict priority, and weighted round robin), these schemes are not always effective, as they lack awareness of packet launch times and traffic class priorities when the packet descriptors are prefetched from memory. Thus, while these schemes provide some improvement in the scheduling of data packets for transmission on the wire, they are completely unaware of when to prefetch the descriptors for the packets, which renders them unsuitable for low-latency and hard real-time applications, particularly in situations when time-sensitive traffic is intermixed with best effort traffic. For example, when transmitting a burst of packets, high-priority upstream read requests for packet payload data can become blocked or stuck behind low-priority requests, thus leading to huge latency spikes and jitter.

For example, since the descriptor of a packet has to be fetched before its payload, the DMA scheduler of a NIC typically gives higher priority to descriptor prefetches than to payload fetches. This can cause generation of several descriptor prefetch requests from each packet transmit queue to be ahead of the payload fetch requests. For example, a NIC with 8 packet transmit queues that performs prefetching 16 entries deep into each queue can generate 128 descriptor read requests, which can cause head of the line blocking for the actual packet payload DMA requests. The worst-case scenario requires waiting on the DMA completions for all 128 descriptors before the first payload DMA request can even be scheduled. Increasing the outstanding credits can improve the average bandwidth, but it will not help latency and determinism because the payload data DMA requests are still sequenced behind all 128 descriptor requests. In addition, in current NIC architectures, access to the internal queue buffers (e.g., RF memory) is single channel—thus, while writing low-priority completions into the queue buffers, the high-priority completions must wait, which further increases the transmission latency.

There are various scheduling algorithms that can be implemented on a NIC to improve timeliness and determinism for packet transmissions, such as time-based scheduling (TBS), credit-based shaper (CBS), and enhancements for scheduled traffic (EST).

The time-based scheduling (TBS) method adds a new field containing the packet launch time to the descriptor for a packet. In this manner, once the scheduler fetches and parses the descriptor, it knows when to transmit the packet, which reduces some uncertainty associated with the packet transmission. Since the launch time is part of the descriptor itself, however, the descriptors need to be prefetched before the corresponding packet payload fetches can even be scheduled. As a result, the scheduler generates the descriptor read requests for all queues and traffic classes, which can create a latency bubble since the high-priority packet payload requests are queued behind the descriptor requests.

The credit-based shaper (CBS) method—which is defined in the IEEE 802.1Qav standards—schedules packets for transmission based on the availability of credits for the respective queues. Once again, this method focuses on determining when to launch a packet on the line. The descriptors, however, are always prefetched regardless of the availability of credits for a queue—the scheduler will start initiating the descriptor prefetches as soon as the tail point of the queue is advanced and new descriptors become available to prefetch. While the head of the line blocking problem could potentially be addressed by extending the credit-based scheduling method to the descriptors (e.g., waiting for available credits before prefetching descriptors), that is not a viable solution, as it would significantly increase the overall packet transmission latency (e.g., due to waiting for credits to become available, then fetching the descriptor, and then fetching the packet payload data).

The enhancements for scheduled traffic (EST) method—which is defined in the IEEE 802.1Qbv standards—uses "gate control lists" (GCLs) to determine when to transmit packets. Each gate control list specifies when a particular queue is open or closed for the purpose of transmitting the packets in that queue. Once again, this method focuses on scheduling in connection with the packet payload data rather than the descriptor. Thus, while this method improves control over when to launch packets, it does not address when to prefetch descriptors. As a result, this method suffers from the same drawbacks as the other scheduling methods noted above.

While the methods above improve scheduling considerably, none of them address the head of the line blocking problem and associated latency spikes caused by descriptor prefetches. The above methods primarily address packet scheduling and launching with respect to the payload data, meaning when to transmit the data packets on the line or wire, but they have no mechanism for intelligently prefetching descriptors (e.g., based on the traffic classes of the corresponding packets).

In addition, there is no separation of requests based on traffic class—all upstream DMA read requests for both descriptors and payloads are ordered sequentially in a single request queue. As a result, any low-priority request that is ahead of a high-priority request will block the high-priority request and cause a huge latency spike, which leads to indeterminism and increases the overall end-to-end latency.

Another disadvantage of these methods is the lack of traffic class quality of service (QoS) differentiation beyond having separate queues. For example, there is no differentiation in data fetching for real-time traffic versus best-effort traffic—both types of packets take the same amount of time to fetch since they go through the same I/O bus (e.g., an AXI/IOSF bus) and virtual channel. Moreover, arbitration is only performed at the time of request initiation, which means high-priority requests from express queues that come just after low-priority traffic requests get stuck behind in the queue waiting. Further, increasing the number of credits will not help because a later scheduled high-priority request can still wait behind a prior scheduled low-priority descriptor request.

The latencies associated with fetching descriptors and packet data could potentially be improved using various other techniques, such as storing descriptors in the NIC itself rather than in main memory. While that approach can significantly reduce the overall packet transmit latency, it requires substantial changes to the existing NIC hardware and NIC software driver model.

Thus, network interface controllers suffer from various design limitations that render them susceptible to latency, jitter, and transmission delays in certain situations. Shorter cycle times are vital to many applications and use cases, however, such as industrial control loop applications and workload consolidation. Accordingly, this disclosure presents various solutions for minimizing packet latency and jitter in a network interface controller, along with solutions for accurately monitoring packet latency and jitter in real time, which are particularly beneficial to time sensitive networking (TSN) applications.

Deterministic, Low-Latency Scheduling of Real-Time Burst Data for Time Sensitive Networking (TSN)

As explained above, network interface controllers suffer from various design limitations that lead to packet latency, jitter, and transmission delays in certain scenarios. FIG. 1 illustrates an example embodiment of a network interface controller (NIC) 100 that suffers from the design limitations noted above. For example, as described further below, a single memory path is used for all traffic classes which leads to a bottleneck, and a funneling effect due to the crowding of read requests leads to grant delay and eventually completion delay for the requests, as high-priority requests may be waiting behind low-priority requests.

In the illustrated embodiment, NIC 100 includes multiple packet transmit queues 102, a MAC layer engine 104 for scheduling (e.g., using scheduler 105) and transmitting packets over a network 130 via a transmission interface 117, a mux 103 to select packets from the queues 102 to feed to the MAC layer engine 104, a DMA engine 108 to retrieve DMA descriptors and data for packet transmissions, a descriptor cache 110 to cache DMA descriptors retrieved by DMA engine 108, an I/O interface 112 for system I/O, a read request queue 115 and a completion queue 116 for memory read requests and completions (e.g., for packet descriptors/data), and a system fabric bridge 114 for communication with other portions of the computing system or SoC (e.g., main memory 120) via a system fabric or interconnect.

In the illustrated embodiment, NIC 100 includes eight packet transmission queues 102, designated as queues 0-7 ($Q_0$-$Q_7$), and each queue 102 can be mapped to a unique virtual local area network (VLAN) ID by an application. In addition, these queues 102 are internally mapped to various traffic classes (e.g., $TC_0$-$TC_7$) based on the level of QoS that must be provided for the packets in each queue 102. In the illustrated embodiment, however, all of the traffic classes are mapped to the same virtual channel ($VC_0$) for communication and I/O with other portions of the computing system (e.g., main memory 120 and any other components on the same system-on-a-chip (SoC) as the NIC 100).

For example, express traffic with the highest priority (e.g., time-sensitive data with stringent QoS requirements) may be mapped to queue 7, and queue 7 may be mapped to traffic class 7 ($TC_7$), which is used for real-time traffic. Meanwhile, best effort traffic with the lowest priority or QoS may be mapped to queue 0, and queue 0 may be mapped to traffic class 0 ($TC_0$), which is used for traffic with the lowest priority. All of these traffic classes, however, share the same virtual channel ($VC_0$) for on-chip communication and I/O.

In this manner, each queue is statically mapped to a traffic class with fixed priority. Moreover, this mapping is based on the numerical assignment of each queue rather than the VLAN ID. For example, the priority of a queue is fixed by the numerical assignment of the queue, meaning queue 7 has higher priority than queue 6, queue 6 has higher priority than queue 5, . . . , and queue 1 has higher priority than queue 0. This fixed-priority scheme restricts applications, however, as dynamic assignment of traffic to the queues is not possible—the ability to dynamically assign traffic to queues is particularly important for applications in dynamic environments, such as industrial applications where workloads constantly change as field devices are added or go down (e.g., fail).

The order in which packets are transmitted from the respective queues 102 is determined based on a scheduling algorithm implemented by a scheduler 105, such as time based scheduling (TBS), credit based shaper (CBS) (IEEE 802.1Qav), or enhancements for scheduled traffic (EST) (IEEE 802.1Qbv), as described above.

Based on the scheduling algorithm performed by the scheduler 105, the media access control (MAC) layer 104 simply generates a request to a direct memory access (DMA) engine 108. The DMA engine 108 then arbitrates among the packet queues 102 based on their fixed priority and generates a DMA request for the chosen packet. However, since the descriptor holds the address pointer to the packet payload data that needs to be transmitted, the descriptor needs to be fetched prior to the generation of a DMA data request for the packet payload. Thus, if the descriptor has not already been prefetched, then the DMA engine 108 generates a descriptor request before it fetches the packet data.

In the illustrated embodiment, however, there is only one input/output (I/O) interface 112 to service I/O requests, which means there is only one read request queue 115 for both descriptors and packet data across all packet queues 102. As a result, the DMA data request for the packet payload might have to wait in the read request queue 115 until the requests that are issued ahead are granted. This is not an issue when dealing with a single packet queue 102 given that there are no priorities for a single queue. However, when multiple packet queues 102 are enabled (e.g., which is the case for TSN-based applications), there will be descriptor prefetch requests belonging to each packet queue 102, which can block the packet data requests. In particular, while the purpose of descriptor prefetching is to reduce end-to-end latency, there is a side effect that can occur when a burst of back-to-back data contains hard real-time traffic intermixed with low-priority traffic, as the real-time requests can sometimes get stuck behind the low-priority requests and incur huge latency spikes. The concept of prefetching significantly helps improve overall bandwidth, and this scheme can be used when there are some guard bands around real-time traffic, but it is not well suited for back-to-back burst traffic.

Figure 2:
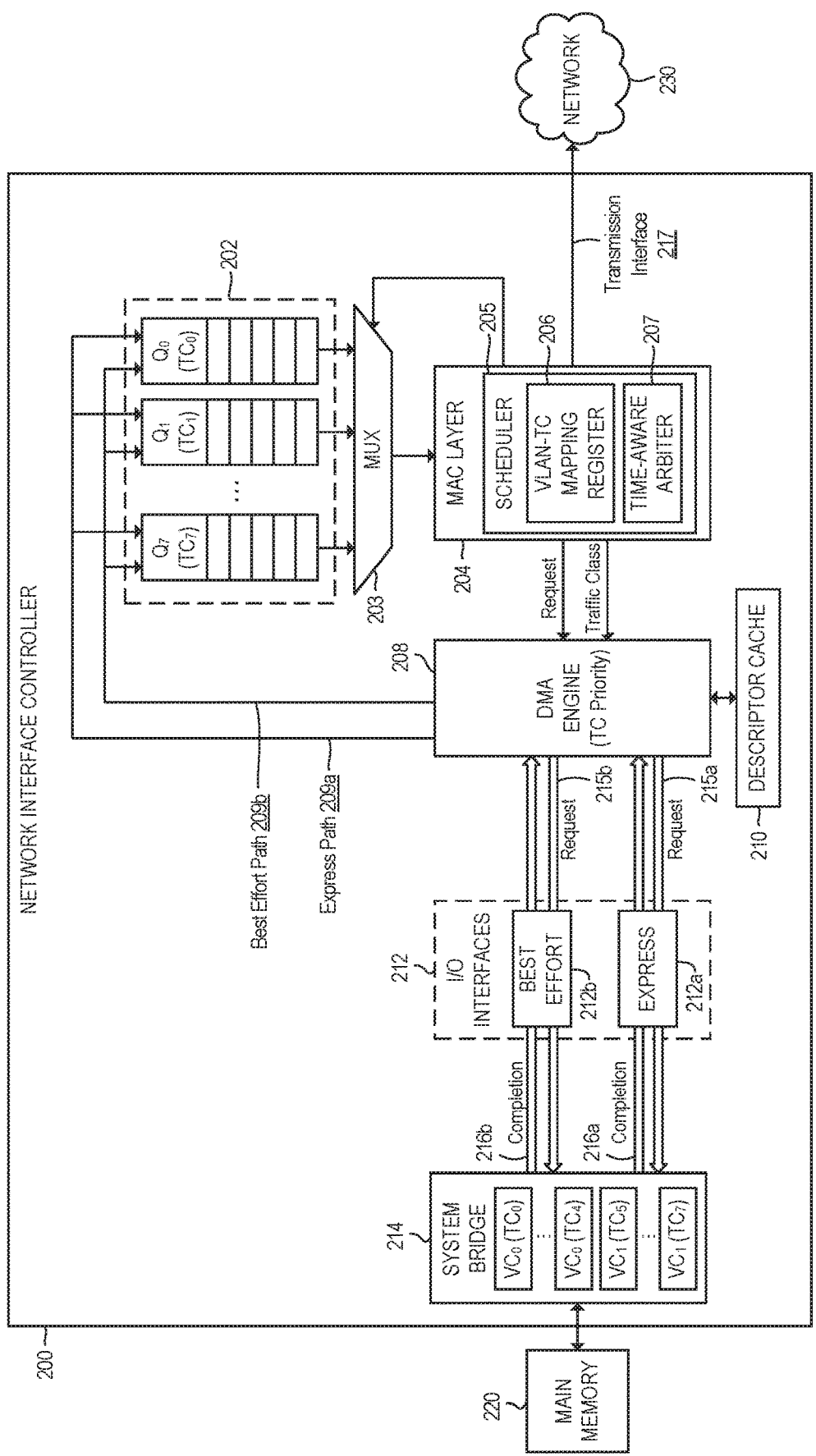
FIG. 2 illustrates an example embodiment of a network interface controller with traffic-class-based scheduling and DMA for deterministic packet transmissions.

Accordingly, FIG. 2 illustrates an example embodiment of a network interface controller (NIC) 200 with traffic-class-based scheduling and DMA for deterministic packet transmissions, which eliminates the design limitations and indeterminisms described above in connection with NIC 100 of FIG. 1.

In the illustrated embodiment, NIC 200 includes multiple packet transmit queues 202, a MAC layer engine 204 for scheduling and transmitting packets over a network 230 via a transmission interface 217 (e.g., using scheduler circuitry 205, VLAN to TC mapping register 206, and time-aware arbiter 207), a mux 203 to select packets from the queues 202 to feed to the MAC layer engine 204, DMA engine circuitry 208 to retrieve DMA descriptors and data for packet transmissions, a descriptor cache 210 to cache DMA descriptors retrieved by DMA engine 208, multiple data paths 209a-b for express and best-effort traffic between the DMA engine 208 and packet queues 202, multiple I/O interfaces 212a-b and corresponding request queues 215a-b and completion queues 216a-b for express and best-effort traffic, and a system fabric bridge 214 for communication with other portions of the computing system or SoC (e.g., main memory 220) via a system fabric or interconnect.

In the illustrated embodiment, NIC 200 includes eight packet transmission queues 202, designated as queues 0-7 ($Q_0$-$Q_7$), and each queue 202 can be mapped to a unique virtual local area network (VLAN) ID by an application. In addition, these queues 202 are internally mapped to various traffic classes (e.g., $TC_0$-$TC_7$) based on the level of QoS that must be provided for the packets in each queue 202. Further, each traffic class is mapped to a corresponding virtual channel (VC) for communication and I/O with other components of the computing system, such as main memory 220.

For example, for an SoC that supports two virtual channels ($VC_0$ and $VC_1$), express traffic with the highest priority (e.g., time-sensitive data with stringent QoS requirements) may be mapped to queues 5-7 ($Q_5$-$Q_7$), queues 5-7 ($Q_5$-$Q_7$) may be respectively mapped to traffic classes 5-7 ($TC_5$-$TC_7$), and the data flow on traffic classes 5-7 ($TC_5$-$TC_7$) may be routed over virtual channel 1 ($VC_1$), which is reserved for real-time traffic. Meanwhile, best effort traffic with the lowest priority or QoS may be mapped to queues 0-4 ($Q_0$-$O_4$), queues 0-4 ($Q_0$-$Q_4$) may be respectively mapped to traffic classes 0-4 ($TC_0$-$TC_4$), and the data flow on traffic classes 0-4 ($TC_0$-$TC_4$) may be routed over virtual channel 0 ($VC_0$), which is used for low-priority traffic.

Alternatively, for an SoC that supports the same number of virtual channels as the number of traffic classes supported by the NIC 200, each traffic class may be mapped to a unique virtual channel. For example, assuming eight traffic classes and virtual channels are supported, traffic classes $TC_0$-$TC_7$ may be respectively mapped to virtual channels $VC_0$-$VC_7$.

Moreover, in the illustrated embodiment, traffic-class-based arbitration is performed among the packet queues 202 to schedule DMA descriptor and data requests for packets based on their traffic class, and those requests are processed using separate I/O interfaces 212a-b, read request queues 215a-b, and completion queues 216a-b for different levels of QoS, such as express versus best-effort traffic. In this manner, the DMA descriptor and data requests for packets are scheduled and split over separate data paths based on the traffic class assigned to each packet transmit queue.

For example, multiple separate I/O interfaces 212a-b, read request queues 215a-b, completion queues 216a-b, and data paths 209a-b are used to process traffic with different levels of priority. In the illustrated embodiment, for example, express traffic and best-effort traffic on NIC 200 are respectively processed using two separate I/O interfaces 212a-b, read request queues 215a-b, completion queues 216a-b, and data paths 209a-b from the DMA engine 208 back to the packet transmit queues 202.

However, the number of supported I/O paths and traffic classes may vary in different embodiments. In some embodiments, for example, the number of supported I/O paths and traffic classes may be equivalent, such that each traffic class has its own dedicated I/O path (e.g., two separate I/O paths for two traffic classes, eight separate I/O paths for eight traffic classes, etc.). Alternatively, the number of supported I/O paths may be smaller than the number of supported traffic classes, such that multiple traffic classes share the same I/O path (e.g., a first I/O path for best effort traffic shared by traffic classes 0-4, and a second I/O path for express traffic shared by traffic classes 5-7).

In the illustrated embodiment, the MAC scheduler 205 generates an upstream read request based on the traffic class and passes this traffic class information to the DMA engine 208. The DMA engine 208 then generates read requests in two separate request queues 215a-b, which are processed over two separate I/O interfaces 212a-b. For example, read requests for high-priority real-time traffic, referred to as "express" traffic, will go on an "express" read request queue 215a over an "express" I/O interface 212a, and the responsive data will similarly be returned via an "express" completion queue 216a over the express I/O interface 212a. Meanwhile, read requests for low-priority traffic, referred to as "best-effort" traffic, will go on a "best effort" read request queue 215b over a "best effort" I/O interface 212b, and the responsive data will similarly be returned via a "best effort" completion queue 216b over the express I/O interface 212a. The I/O interfaces 212a-b, queues 215a-b and 216a-b, and system bridge 214 may be implemented using any suitable I/O interface or fabric standards, such as Advanced eXtensible Interface (AXI) and/or Intel On-Chip System Fabric (IOSF), among other examples.

Moreover, the data path to the internal packet transmit queue buffers 202 (e.g., RF memory) is also split across traffic classes to eliminate collisions. In the illustrated embodiment, for example, there are separate express and best effort data paths or interfaces 209a-b from the DMA engine 208 to the packet transmit queues 202.

In the illustrated embodiment, the MAC layer 204 implements "traffic-class-aware" arbitration on top of the existing scheduling algorithms implemented by the scheduler 205 (e.g., TBS/Qav/Qbv). To facilitate this, there is a register 206 in the MAC layer 204 that maps VLAN ID to traffic class for each queue 202, which is referred to as the VLAN to traffic class mapping register 206. This mapping enables dynamic allocation of traffic class priorities rather than being limited to a fixed priority scheme (e.g., the fixed priority scheme of NIC 100 in FIG. 1).

In addition to the VLAN ID to TC mapping register 206, the MAC layer 204 includes a time-aware arbiter 207 that uses separate prefetch timers for each queue 202. For example, the value of each prefetch timer may depend on the traffic class.

Accordingly, based on the scheduling algorithm (e.g., TBS/Qav/Qbv) along with the traffic class and prefetch timer value, the MAC layer 204 and/or scheduler 205 now knows precisely when to generate descriptor prefetch requests. Instead of blindly generating descriptor prefetch requests for all queues 202, now the MAC layer 204 has ample information to determine when to prefetch the descriptor for a packet and when to issue the data DMA request for a packet. Accordingly, the arbitration now happens in the MAC layer 204 rather than in the DMA engine 208—the DMA engine 208 is simply a conduit for the MAC layer 204.

When the MAC layer 204 schedules a request, the traffic class information along with a read request is passed to the DMA engine 208, and the DMA engine 208 simply processes the request as either "express" or "best effort" based on its traffic class. For example, the high-priority (express) requests are directed to the express request queue 215a, while the low-priority (best effort) requests are directed to the best effort request queue 215b. Each request queue 215a-b may have its own credits.

On the SoC fabric side, each request queue 215a-b is mapped to a separate virtual channel on the bridge 214 from the NIC 200 to the larger computing system or system-on-a-chip (SoC). Since plumbing of these virtual channels already exists on the SoC side all the way to memory 220, low-latency QoS is maintained end-to-end. The completions are returned to the NIC 200 via two separate virtual channels—virtual channel 0 ($VC_0$) for "best effort" traffic and virtual channel 1 ($VC_1$) for "express" traffic—and similarly, they are then directed to two separate completion buffers 216a-b on the NIC 200.

If the completion is for a descriptor, the DMA engine 208 parses the descriptor and generates a data DMA request for the packet payload on the same type of request queue 215a or 215b. The completion data is then routed to local queue memory 202 on separate data paths 209a-b for express versus best effort traffic. Splitting the internal memory path ensures that there are no collisions of high-priority and low-priority data while writing into the packet queue memory 202.

Based on the scheduling algorithm and launch time, the packet data is read from the local queue memory 202, packetized by adding the respective fields of the packet, and then transmitted on the wire over a network 230 in a deterministic manner.

This solution provides numerous advantages. For example, this solution reduces end-to-end latency, can achieve shorter cycle time and more workload consolidation, and provides precise packet transmission per traffic class scheduling and thus improves overall cycle jitter. In particular, this solution significantly reduces latency by having traffic-class-based scheduling/arbitration and by having separate request queues for high-priority express traffic descriptors and data and low-priority best effort traffic descriptors and data. Having traffic-class based arbitration and separating high and low-priority requests into different queues significantly improves the determinism and reduces latency. In addition, this scheme eliminates the "head of the line" blocking problem described above (e.g., in connection with NIC 100 of FIG. 1), as high-priority traffic requests will no longer wait behind the low-priority traffic requests. Moreover, while the examples above are primarily described in connection with two traffic classes or priorities, this solution can scale to any number of traffic classes and queues. For example, as per the IEEE 802.1Q specifications, there can be up to 8 traffic class priorities.

In various embodiments, the respective components and functionality of NIC 200 may be implemented using any suitable combination of hardware and/or software logic, including processing circuitry, memory, communication interfaces, firmware, drivers, applications, and so forth, as described in connection with other embodiments.

Figure 3:
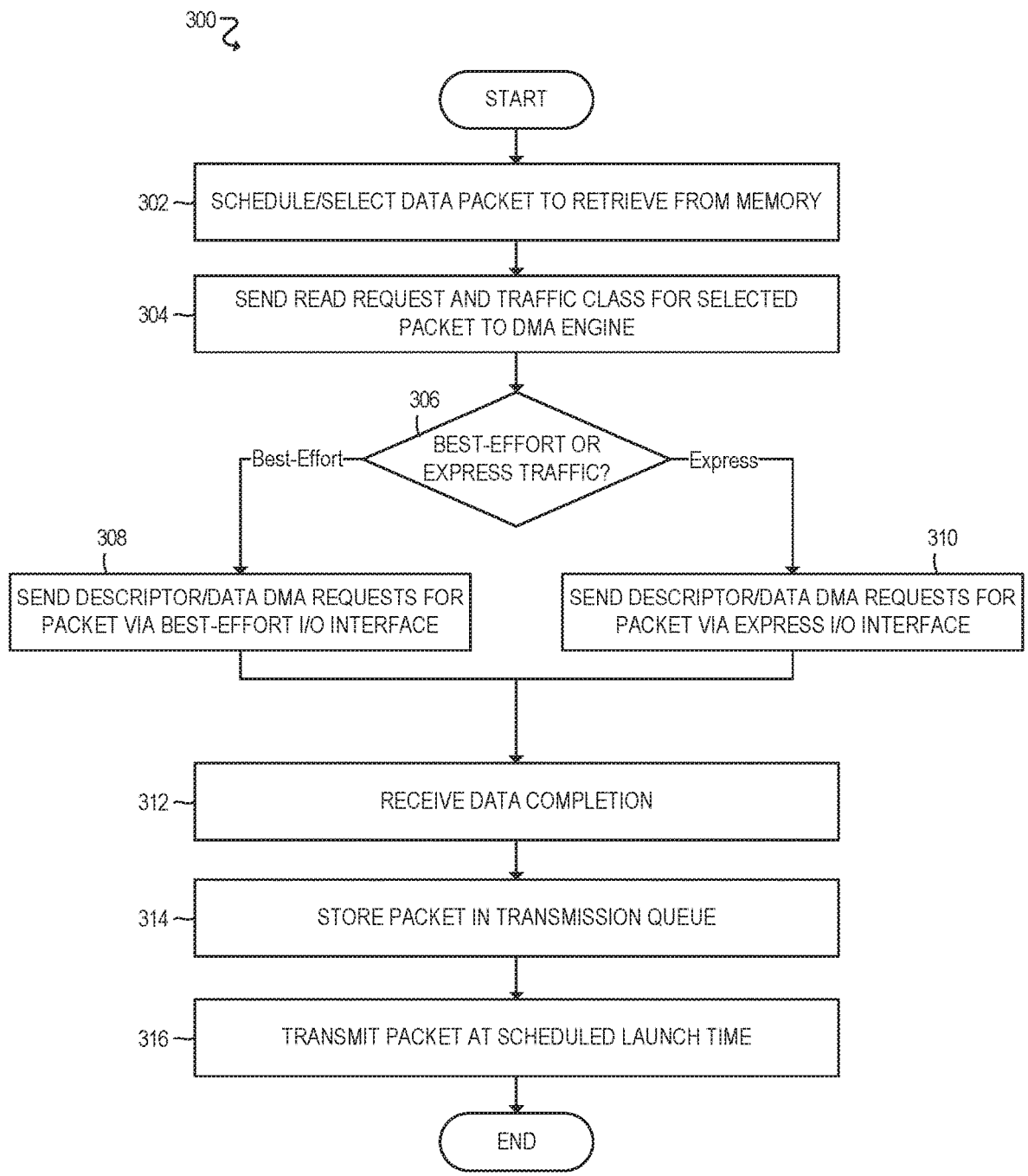
FIG. 3 illustrates a flowchart for performing traffic-class-based scheduling and DMA for deterministic packet transmissions on a network interface controller (NIC) in accordance with various embodiments.

FIG. 3 illustrates a flowchart 300 for performing traffic-class-based scheduling and DMA for deterministic packet transmissions on a network interface controller (NIC) in accordance with various embodiments. In various embodiments, for example, flowchart 300 may be implemented and/or performed using NIC 200 of FIG. 2 and/or any other network interface controllers, computing devices, platforms, systems, and environments described throughout this disclosure.

The flowchart begins at block 302, where scheduler circuitry of the NIC schedules or selects a packet to retrieve from main memory of a host computing system (e.g., based on scheduling algorithms, traffic classes/traffic priorities, prefetch timers, etc.).

The flowchart then proceeds to block 304, where the scheduler circuitry sends a read request and the traffic class for the selected packet to DMA engine circuitry.

The flowchart then proceeds to block 306, where the DMA engine circuitry determines whether the packet contains best effort or express traffic (e.g., based on the traffic class provided by the scheduler circuitry).

If the packet contains best-effort traffic, the flowchart then proceeds to block 308, where the DMA engine circuitry sends a descriptor request, and subsequently a data DMA request (e.g., once the descriptor is returned), for the packet over a best effort I/O interface.

If the packet contains express traffic, however, the flowchart then proceeds to block 310, where the DMA engine circuitry sends a descriptor request, and subsequently a data DMA request (e.g., once the descriptor is returned), for the packet over an express I/O interface.

The flowchart then proceeds to block 312, where the DMA engine circuitry receives the data completion with the packet payload data, and then to block 314, where the DMA engine circuitry stores the packet data in the appropriate transmission queue of the NIC for that packet.

The flowchart then proceeds to block 316, where the MAC layer and/or scheduler of the NIC schedules the packet for transmission over a transmission interface at the specified launch time for the packet.

At this point, the flowchart may be complete. In some embodiments, however, the flowchart may restart and/or certain blocks may be repeated. For example, in some embodiments, the flowchart may restart at block 302 to continue scheduling and transmitting data packets.

Deterministic, Low-Latency Descriptor Decoupled DMA for Time Sensitive Networking The ability of a NIC to transmit a packet deterministically within a short amount of time depends not only on its scheduling algorithms (e.g., as defined in the various IEEE TSN standards, such as IEEE 802.1Qav and IEEE 802.1Qbv), but also the latency and jitter associated with the amount of time required to fetch data from main memory.

For example, as explained above, a NIC typically uses direct memory access (DMA) operations to fetch data required for packet transmissions from main memory, such as the descriptor and the payload data for each packet. The descriptor merely contains a pointer to a memory address where the payload data for the packet is stored, while the payload data contains the actual contents of the packet. Thus, the NIC does not have knowledge of where the packet payload is stored until it fetches the descriptor, which means the descriptor must be fetched before the packet payload. As a result, a NIC typically performs at least two round-trip DMA operations for every packet transmission—one DMA operation to prefetch the descriptor and another to fetch the packet payload. In some cases, however, the latency and jitter associated with these DMA operations can lead to packet transmission delays.

In particular, a NIC typically employs a single DMA engine to fetch both descriptors and packet payloads (e.g., as shown and described above in connection with NIC 100 of FIG. 1). For example, once the tail pointer of a packet transmit queue is advanced by the NIC software driver, the MAC layer initiates a request to the sole DMA engine on the NIC to fetch the descriptors. For time-sensitive applications, however, the NIC often needs more than one packet queue: at least one queue for hard real-time traffic and one or more queues for best-effort traffic. In some embodiments, for example, a NIC may support up to 8 transmit queues and 8 receive queues. As a result, the NIC must issue multiple upstream read requests containing an intermix of both descriptor requests and payload data requests. For example, the MAC layer may be fetching descriptors for some queues and payload data for other queues, while also performing upstream writes for certain queues. Moreover, all these operations are handled by a single DMA engine in current NIC architectures. The use of a single DMA engine for an intermix of time-sensitive transactions and non-time-critical transactions will lead to large latency spikes, however, which can be highly problematic for time-sensitive applications (e.g., real-time industrial applications). For example, deterministic/shorter cycle times are vital for industrial control loop applications and workload consolidation. Accordingly, it is crucial to eliminate these latency spikes for such applications.

For example, the majority of the packet transmission latency is caused by the descriptor and packet data DMA operations. Every packet transmission requires two round-trip delays between the MAC layer of the NIC and main memory (one round trip for the descriptor and another round trip for the packet payload). In current NIC architectures, descriptor prefetching is performed far in advance of the corresponding packet transmissions, which greatly improves the line throughput and bandwidth. When multiple time-sensitive queues are enabled, however, descriptor prefetch requests from one queue often get scheduled ahead of packet data requests from another queue. As a result, the time-sensitive packet data requests have to wait for the previously scheduled descriptor requests to be granted, and those packet data requests will simply wait in the request queue until they are eventually granted, which leads to additional packet latency and jitter.

For example, referring back to FIG. 1, NIC 100 includes multiple packet transmission queues 102, designated as queues 0-7, and each queue 102 can be mapped to a unique virtual local area network (VLAN) ID by an application. In addition, these queues 102 are internally mapped to various traffic classes (e.g., $TC_0$-$TC_7$) based on the level of QoS that must be provided for the packets in each queue 102. For example, express traffic with the highest priority (e.g., time-sensitive data with stringent QoS requirements) may be mapped to queue 7, and queue 7 may be mapped to traffic class 7 ($TC_7$), which is used for real-time traffic. Meanwhile, best effort traffic with the lowest priority or QoS may be mapped to queue 0, and queue 0 may be mapped to traffic class 0 ($TC_0$), which is used for traffic with the lowest priority. Moreover, in the illustrated embodiment, all of the traffic classes share the same virtual channel ($VC_0$) for on-chip communication and I/O.

In this manner, each queue 102 is statically mapped to a traffic class with fixed priority, which is based on the numerical assignment of each queue rather than the VLAN ID (e.g., queue 7 has higher priority than queue 6, queue 6 has higher priority than queue 5, . . . , and queue 1 has higher priority than queue 0).

Based on the scheduling algorithm implemented by the scheduler 105 (e.g., TBS, CBS (IEEE 802.1Qav), EST (IEEE 802.1Qbv)), the media access control (MAC) layer 104 simply generates a request to a direct memory access (DMA) engine 108. The DMA engine 108 then arbitrates among the queues 102 based on their fixed priority and generates a DMA request for the chosen packet. However, since the descriptor holds the address pointer to the packet payload data that needs to be transmitted, the descriptor needs to be fetched prior to the generation of a DMA data request for the packet payload. Thus, if the descriptor has not already been prefetched, then the DMA engine 108 generates a descriptor request before it fetches the packet data.

In the illustrated embodiment, however, there is only one input/output (I/O) interface 112 to service I/O requests, which means there is only one read request queue 115 for both descriptors and packet data across all packet queues 102. As a result, the DMA data request for the packet payload might have to wait in the read request queue 115 until the requests that are issued ahead are granted. This is not an issue when dealing with a single packet queue 102 given that there are no priorities for a single queue. However, when multiple packet queues 102 are enabled (e.g., which is the case for TSN-based applications), there will be descriptor prefetch requests from several packet queues 102, which can block the packet data requests.

Thus, while the purpose of descriptor prefetching is to increase bandwidth utilization and reduce end-to-end latency, the current approach is only effective for a single queue, as various side effects can occur when descriptor prefetching is used with multiple time-critical queues. For example, due to the intermixing of descriptors with data packet payload requests, sometimes time-sensitive data payload requests may get stuck behind low-priority (e.g., best-effort) data packet and descriptor requests, which can severely impact packet transmission latencies.

This side effect can be reduced by separating the best-effort traffic from express traffic by having separate I/O interfaces and request queues, as described above in connection with the implementation of NIC 200 of FIG. 2. While this channel separation technique can greatly reduce the interference from best-effort traffic, there can still be unintended interference among the respective express traffic requests. For example, a descriptor request from one express queue can get well ahead of a packet data request from another express queue, which can cause large latency spikes.

Thus, the use of multiple traffic classes and virtual channels (e.g., as described above in connection with NIC 200 of FIG. 2) can reduce these latency spikes to some extent, but it does not eliminate them. For example, multiple queues could be assigned as time-sensitive queues and the transactions among those time-sensitive queues could go on the same traffic class and virtual channel. Separating the best-effort queues from the time-sensitive queues and routing the best-effort transactions on a separate traffic class and virtual channel (e.g., $TC_0$/$VC_0$) can greatly reduce the latency spikes. However, since multiple time-sensitive queues may be assigned to the same traffic class and/or virtual channel, there is still a risk of a latency spike, as the descriptor prefetching for one time-sensitive queue could intermix with the packet payload fetching for another time-sensitive queue. Since a single DMA engine is used for both the descriptors and packet data, these transactions go in the same request queue one behind another. As a result, the packet payload transaction has to wait until the descriptor prefetch is granted, thus incurring additional latency. On top of that, since descriptor prefetching is typically performed in burst mode, any packet payload transaction initiated around this time will have to wait for the entire burst of descriptor prefetch transactions to be granted. The additional latency incurred in this scenario typically depends on the prefetch depth for the transmit queues—the larger the prefetch depth, the higher the additional latency.

Thus, while having separate request queues for best effort and express traffic will improve latency significantly, it is still susceptible to large latency spikes. For example, when multiple express queues are enabled, all the express queues will share the same traffic class and channel. Thus, even though the best-effort traffic requests are separated from express traffic requests, the descriptors and packet data in the various express packet queues still must share the same request queue, which eventually leads to unintended latency spikes.

Descriptor-based DMA is a standard architecture that is leveraged by many Ethernet NICs and other I/O protocols (e.g., USB) to reduce latency. Moreover, as described throughout this disclosure, there are also various scheduling algorithms used by NICs to reduce latency, such as time-based scheduling (TBS), credit-based shaper (CBS) (IEEE 802.1Qav), and enhancements for scheduled traffic (EST) (IEEE 802.1Qbv). While these DMA and scheduling techniques provide considerable latency improvements, none of them address the latencies that result from certain DMA operations, such as descriptor prefetching and the intermixing of descriptor prefetch requests with packet data requests.

Another potential approach for reducing DMA latency is assigning a unique traffic class and virtual channel for each packet queue. While this approach is supported by the embodiments described throughout this disclosure, the major disadvantage of this approach is increased area cost and die size. For example, for a NIC with 8 transmit (Tx) queues and 8 receive (Rx) queues, having unique traffic classes and virtual channels for each queue will significantly increase the area and die size. In addition, the SoC may not have enough virtual channels to support unique per-queue assignments, as many current SoCs only support two virtual channels ($VC_0$ and $VC_1$). Further, this approach is not scalable for applications that require a large number of queues, as there are only 8 traffic classes defined in the IEEE 802.1Q standards.

Another potential approach for reducing DMA latency is simply turning off or disabling descriptor prefetching altogether. This will force the MAC to fetch the descriptor for a packet at the time the packet is scheduled for transmission, which means the DMA operations for the descriptor and data payload of a packet will be sequential, thus eliminating the possibility of several descriptor requests getting ahead of a data payload request. However, the main disadvantage of this approach is that the NIC will have very low bandwidth utilization due to large inter-packet gaps. For example, there will be large inter-packet gaps due to the latencies associated with the SoC, thus preventing the full line rate from being achieved. This is a major limitation for applications where the full line rate is needed and when there is a large volume of best-effort traffic for non-real-time applications.

Another potential approach for reducing DMA latency is storing descriptors in the NIC itself rather than in main memory (e.g., DDR memory), which can significantly reduce the overall packet transmit latency but also requires substantial changes to the existing NIC hardware and the NIC software driver model.

Accordingly, this disclosure presents a novel solution for reducing DMA latency in a network interface controller by decoupling and isolating descriptor prefetching from packet data fetching. The descriptors are prefetched independently from the packet payloads on a different traffic class/channel and stored in a descriptor cache.

In the proposed solution, for example, the descriptor DMA is completely decoupled from the packet data DMA, and the descriptor DMA transactions are processed on a best effort channel. For example, the DMA engine used for descriptors and packet data may be split into multiple separate DMA engines, each of which handles either descriptor DMA or packet data DMA. The respective DMA engines may either be physically or logically separate, such as two independent or distinct DMA engines that respectively perform descriptor and packet data DMA, or a single DMA engine that logically supports separate and independent DMA threads for descriptors and packet data DMA. Regardless of the underlying implementation, the key is for the DMA engine(s) to be able to distinguish descriptor requests from packet data requests so they can be processed independently and in parallel (e.g., using separate transaction IDs).

For example, one of the DMA engines may be dedicated to handling descriptor prefetching exclusively. Since descriptors are prefetched far in advance of the packet data payloads, these transactions can tolerate large latencies. Thus, combining descriptor prefetches belonging to both best effort and express queues onto the same low-priority traffic class and virtual channel is tolerable. Since packet data fetching is extremely time critical, however, a separate DMA engine handles these transactions and will route the transactions based on the traffic class and time priority. In this manner, since the descriptor prefetching is completely decoupled from the packet data transactions, the additional latency from intermixing descriptors with time-sensitive packet payload data transactions is eliminated, thus providing more deterministic packet transmissions with less jitter in a short cycle time.

The proposed solution significantly reduces latency by avoiding the intermixing of descriptor and packet data requests and completions. For example, since descriptors are prefetched far in advance and are not very time critical compared to the time-critical data payloads, descriptors from both best effort and express queues are safely routed on a single separate traffic class and virtual channel, which eliminates the head of the line blocking problem and the associated latencies and indeterminism. As a result, the proposed solution reduces end-to-end latency and achieves shorter cycle times and greater workload consolidation. The proposed solution also provides precise packet transmissions using per-traffic-class scheduling, which improves the overall cycle jitter.

Figure 4:
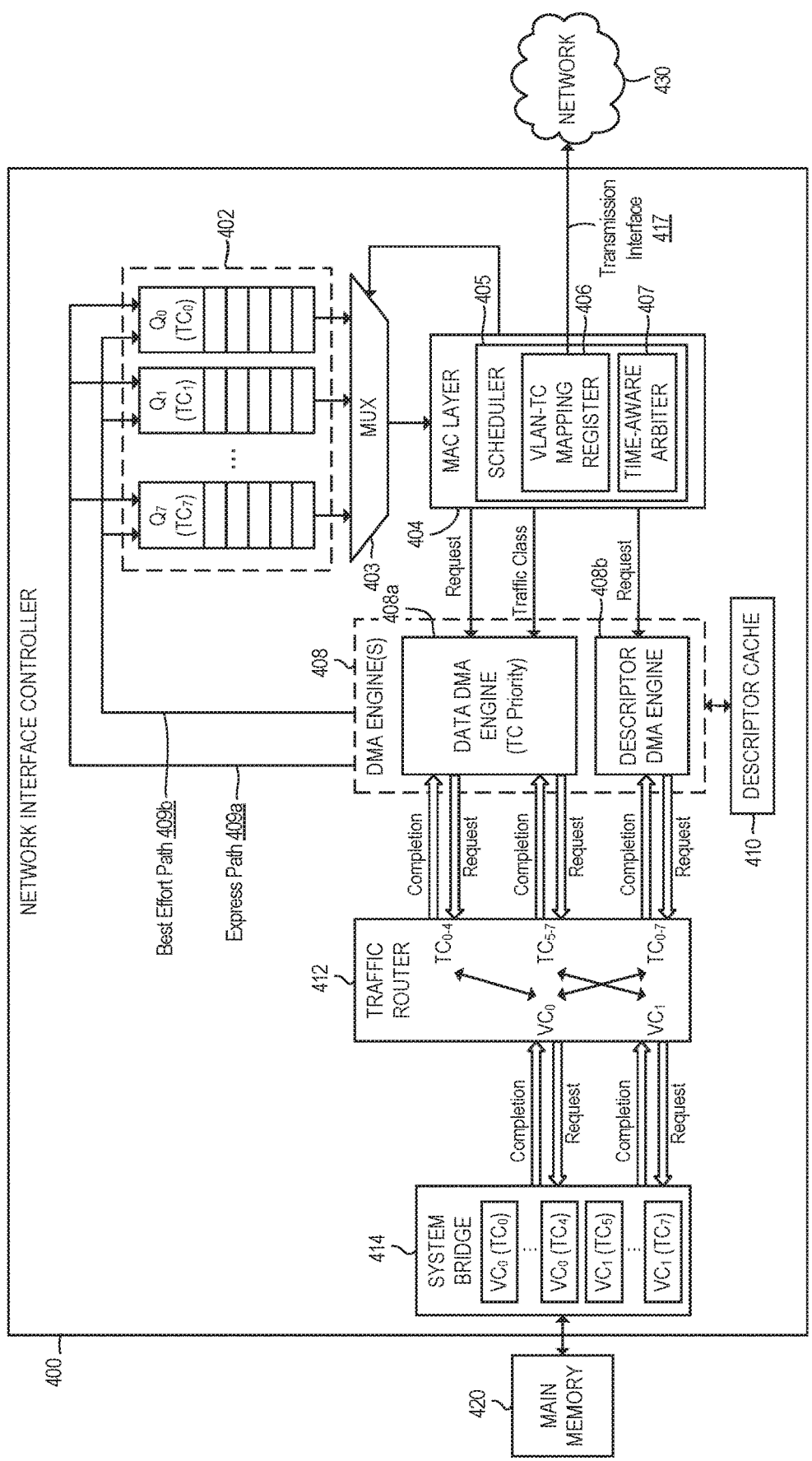
FIG. 4 illustrates an example embodiment of a network interface controller with decoupled descriptor and data DMA for deterministic packet transmissions.

FIG. 4 illustrates an example embodiment of a network interface controller (NIC) 400 that leverages decoupled descriptor and data DMA for deterministic packet transmissions, as described above.

In the illustrated embodiment, NIC 400 includes multiple packet transmit queues 402, a MAC layer engine 404 for scheduling and transmitting packets over a network 430 via a transmission interface 417 (e.g., using scheduler 405, VLAN to TC mapping register 406, and time-aware arbiter 407), a mux 403 to select packets from the queues 402 to feed to the MAC layer engine 404, DMA engine(s) 408*a-b* to retrieve DMA descriptors and data for packet transmissions, a descriptor cache 410 to cache DMA descriptors retrieved by descriptor DMA engine 408*b*, multiple data paths 409*a-b* for express and best-effort traffic between the DMA engine(s) 408 and packet queues 402, a traffic router 412, and a system fabric bridge 414 for communication with other portions of the computing system or SoC (e.g., main memory 420) via a system fabric or interconnect. In various embodiments, some or all of the components of NIC 400 may be similar to those having similar reference numerals from NIC 200 of FIG. 2.

In the illustrated embodiment, the descriptor DMA is completely decoupled from the packet data DMA, and the descriptor DMA transactions are processed on a low-priority or best-effort channel. For example, the DMA engine(s) 408 used for descriptors and packet data is split into multiple DMA engines 408*a-b*, each of which handles either descriptor DMA or packet data DMA. The respective DMA engines 408*a-b* may either be physically or logically separate, such as two independent or distinct DMA engines 408*a-b* that respectively perform descriptor and packet data DMA, or a single DMA engine 408 that logically supports separate and independent DMA threads 408*a-b* for descriptors and packet data DMA. Regardless of the underlying implementation, the key is for the DMA engine(s) 408 to be able to distinguish descriptor requests from packet data requests so they can be processed independently and in parallel (e.g., using separate transaction IDs).

In the illustrated embodiment, for example, the data DMA engine 408a is used to handle packet data DMA requests, and the descriptor DMA engine 408b is used to handle descriptor DMA requests.

Moreover, since the descriptors are prefetched, descriptor DMA requests are much less time sensitive than packet data DMA requests. Thus, in the illustrated embodiment, all descriptor DMA requests are statically mapped to a low-priority traffic class and always go on a best-effort virtual channel (e.g., $VC_0$), regardless of their actual traffic class or priority.

The data DMA engine 408a is dedicated exclusively to DMA data transfers for the packet payloads. Moreover, the data DMA engine 408a has knowledge of traffic classes and traffic-class based arbitration capability, similar to the functionality described above with respect to NIC 200 of FIG. 2. Thus, the data DMA requests are processed based on their traffic class or priority.

As an example, assume NIC 400 supports eight packet transmission queues 402 ($Q_0$-$Q_7$) and eight traffic classes ($TC_0$-$TC_7$), but NIC 400 is implemented on a computing system or SoC that only supports two virtual channels ($VC_0$ and $VC_1$). In some embodiments, best-effort traffic with the lowest priority or QoS may be mapped to queues 0-4 ($Q_0$-$Q_4$), queues 0-4 ($Q_0$-$Q_4$) may be respectively mapped to traffic classes 0-4 ($TC_0$-$TC_4$), and the data flow for traffic classes 0-4 ($TC_0$-$TC_4$) may be routed over virtual channel 0 ($VC_0$) of the computing system, which may be used for low-priority traffic. Meanwhile, express traffic with the highest priority (e.g., time-sensitive data with stringent QoS requirements) may be mapped to queues 5-7 ($Q_5$-$Q_7$), queues 5-7 ($Q_5$-$Q_7$) may be respectively mapped to traffic classes 5-7 ($TC_5$-$TC_7$), and the data flow for traffic classes 5-7 ($TC_5$-$TC_7$) may be routed over virtual channel 1 ($VC_1$) of the computing system, which may be reserved for real-time traffic.

In this example, since the computing system or SoC only supports two virtual channels ($VC_0$ and $VC_1$), the data DMA engine 408a will push the data DMA traffic into two separate read request queues by mapping the traffic classes $TC_0$-$TC_7$ into best-effort and express traffic queues, respectively. For example, since traffic classes $TC_0$-$TC_4$ contain best-effort traffic, they are mapped into a best-effort request queue, which is ultimately routed over the virtual channel used for low-priority traffic (e.g., $VC_0$). Moreover, since traffic classes $TC_5$-$TC_7$ contain express traffic, they are mapped into an express request queue, which is ultimately routed over the virtual channel used for high-priority traffic (e.g., $VC_1$).

The descriptor DMA engine 408b, however, treats all descriptor requests as best-effort traffic regardless of their actual traffic class or priority. For example, all descriptor requests are pushed into a single read request queue regardless of their actual traffic class or priority, which is processed as best-effort traffic and ultimately routed over the virtual channel used for low-priority traffic (e.g., $VC_0$).

The traffic from the various request queues of the DMA engines 408a,b is then fed into a traffic router 412, which maps or routes the traffic into corresponding upstream queues for the appropriate virtual channels ($VC_0$ and $VC_1$).

For example, the traffic router 412 receives traffic from the descriptor DMA engine 408b via a single read request queue, which contains descriptor requests for all traffic classes ($TC_0$-$TC_7$). However, since all descriptor requests are treated as best-effort traffic regardless of their actual traffic class or priority, the descriptor traffic for all traffic classes ($TC_0$-$TC_7$) is routed to the request queue for virtual channel 0 ($VC_0$), which is used for low-priority traffic.

Moreover, the traffic router 412 receives traffic from the data DMA engine 408a via two separate read request queues (e.g., for best-effort traffic and express traffic, respectively). The traffic from one of those request queues contains data DMA requests for traffic classes 0-4 ($TC_0$-$TC_4$), while the traffic from the other request queue contains data DMA requests for traffic classes 5-7 ($TC_5$-$TC_7$). Since the data DMA requests for traffic classes 0-4 ($TC_0$-$TC_4$) are treated as best-effort traffic, that traffic is routed to a request queue for virtual channel 0 ($VC_0$), which is used for low-priority traffic. Moreover, since the data DMA requests for traffic classes 5-7 ($TC_5$-$TC_7$) are treated as express traffic, that traffic is routed to a request queue for virtual channel 1 ($VC_1$), which is used for high-priority traffic.

In this manner, the traffic router 412 pushes data payloads for best-effort traffic classes (e.g., $TC_0$-$TC_4$) and descriptors for all traffic classes (e.g., $TC_0$-$TC_7$) onto the same low-priority virtual channel (e.g., $VC_0$), while the data payloads for express traffic classes (e.g., $TC_5$-$TC_7$) are pushed onto the high-priority virtual channel (e.g., $VC_1$).

As a result, the virtual channel used for low-priority traffic ($VC_0$) is shared by (i) descriptors for all traffic classes (e.g., descriptors for $TC_0$-$TC_7$) and (ii) packet data payloads for low-priority or best-effort traffic classes (e.g., packet data for $TC_0$-$TC_4$), as those types of traffic are relatively less time sensitive compared to the packet data payloads for high-priority express traffic classes (e.g., packet data for $TC_5$-$TC_7$).

Meanwhile, the virtual channel reserved for high-priority traffic ($VC_1$) is used exclusively for time-sensitive packet data payloads for high-priority or express traffic classes (e.g., packet data for $TC_5$-$TC_7$).

In this manner, descriptor DMA is decoupled from all packet data DMA, descriptor DMA and low-priority packet data DMA share the virtual channel assigned to best-effort traffic (e.g., $VC_0$), and time-sensitive packet data DMA uses the virtual channel reserved for express traffic (e.g., $VC_1$). As a result, this approach greatly improves determinism and reduces jitter.

Figure 5:
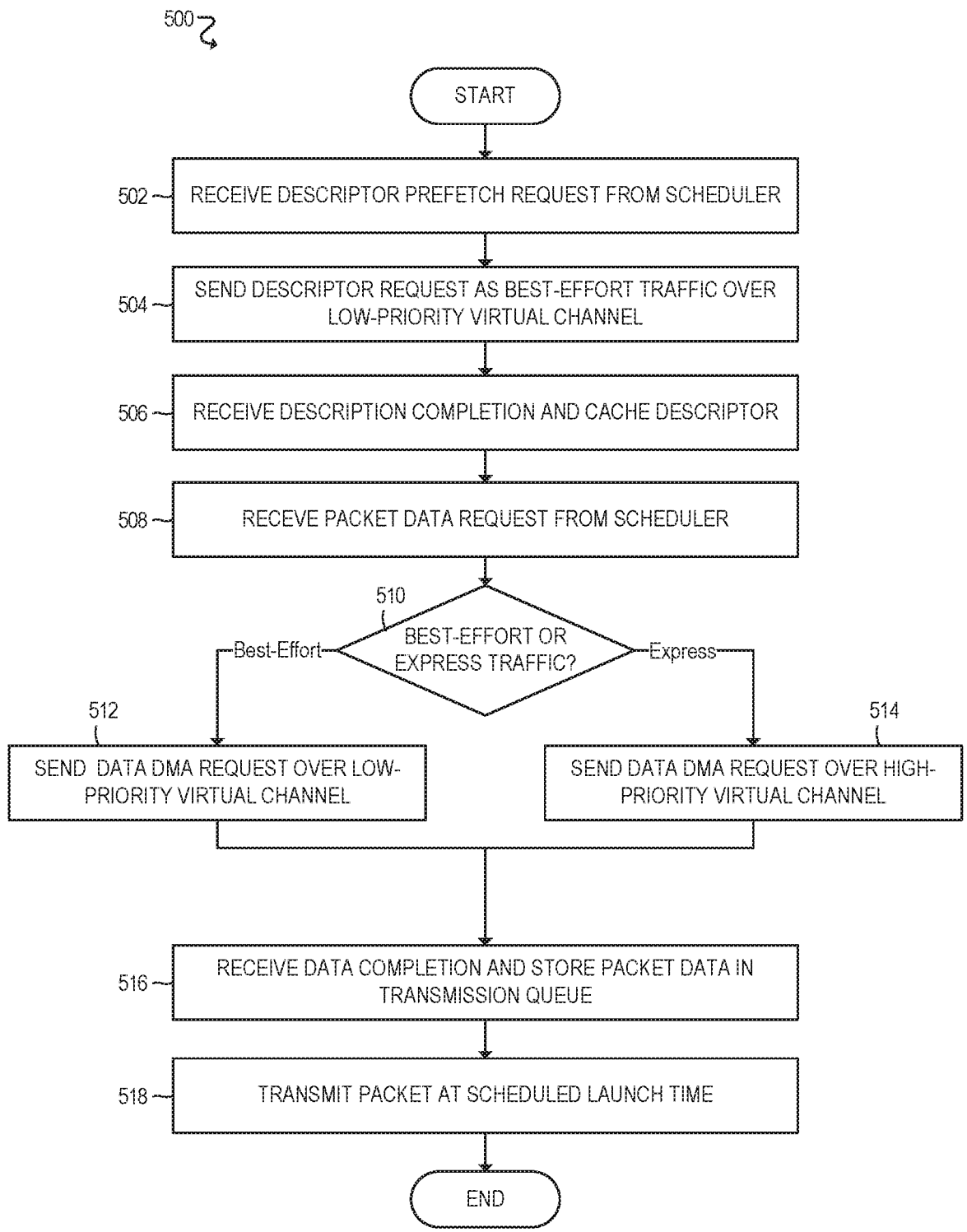
FIG. 5 illustrates a flowchart for performing decoupled descriptor and data DMA for deterministic packet transmissions on a network interface controller (NIC) in accordance with various embodiments.

FIG. 5 illustrates a flowchart 500 for performing decoupled descriptor and data DMA for deterministic packet transmissions on a network interface controller (NIC) in accordance with various embodiments. In various embodiments, for example, flowchart 500 may be implemented and/or performed using NIC 400 of FIG. 4 and/or any other network interface controllers, computing devices, platforms, systems, and environments described throughout this disclosure.

The flowchart begins at block 502, where a descriptor DMA engine receives a descriptor prefetch request from the scheduler on the NIC.

The flowchart then proceeds to block 504, where the descriptor DMA engine sends/routes the descriptor request as best-effort traffic over a low-priority virtual channel regardless of its traffic class.

The flowchart then proceeds to block 506, where the descriptor DMA engine receives the descriptor completion and caches the descriptor in a descriptor cache.

The flowchart then proceeds to block 508, where the data DMA engine receives a packet data request from the scheduler circuitry.

The flowchart then proceeds to block 510, where the data DMA engine determines whether the packet contains best effort or express traffic (e.g., based on the traffic class provided by the scheduler circuitry).

If the packet contains best-effort traffic, the flowchart then proceeds to block 512, where the data DMA engine sends/routes the data DMA request as best-effort traffic over a low-priority virtual channel.

If the packet contains express traffic, however, the flowchart then proceeds to block 514, where the data DMA engine sends/routes the data DMA request as express traffic over a high-priority virtual channel.

The flowchart then proceeds to block 516, where the data DMA engine receives a data completion with the packet payload data and stores the packet data in the appropriate transmission queue of the NIC for that packet.

The flowchart then proceeds to block 518, where the MAC layer and/or scheduler of the NIC schedules the packet for transmission over a transmission interface at the specified launch time for the packet.

At this point, the flowchart may be complete. In some embodiments, however, the flowchart may restart and/or certain blocks may be repeated. For example, in some embodiments, the flowchart may restart at block 502 to continue scheduling and transmitting data packets.

Real-Time Monitoring of Packet Latency and Jitter for Time Sensitive Networking

While the Time Sensitive Networking (TSN) standards define algorithms for precise scheduling of a packet, there are no standardized methods defined for precise, real-time monitoring of the transmit latency and launch time jitter of a packet.

The IEEE 802.3 standards define a Remote Network Monitoring Management Information Base (RMON MIB) specification, which is a standard monitoring specification that enables various network monitors and console systems to exchange network monitoring data. For example, RMON1 MIB consists of ten groups where group 1 collects real-time LAN statistics, such as utilization, collisions, CRC errors, and so forth. Due to these standards, current NIC implementations have various RMON counters that monitor and collect these statistics, such as a frame size counter for all good and bad frames, a frame counter for good multicast frames, a frame counter for CRC errors, and so forth. However, these RMON counters only monitor generic network statistics (e.g., general Ethernet LAN statistics)—they do not monitor the TSN specific real-time packet latencies and jitter associated with TSN packet transfers, nor do they count or track the packets that violate the stipulated launch time. For hard real-time industrial applications, it is critical to monitor packet latencies and jitter in real time (e.g., while the application is running) to determine whether each packet is indeed launched at the correct time and report any misses to the application. Thus, there is currently no standard mechanism to monitor packet latencies and jitter precisely in real time when a time-critical application is running. The existing RMON counters are for generic Ethernet-based statistics and not suited for TSN applications.

Synthetic workloads and test procedures can also be used to monitor or evaluate the performance of packet transmissions. These synthetic workloads and test procedures, however, are not performed in real time, they are inaccurate, and they cannot guarantee whether the system is meeting hard real-time requirements.

For example, this approach involves the use of a non-runtime synthetic test based on synthetic workloads to measure packet latencies and jitter. The synthetic test measures packet latencies from the tail pointer update (e.g., performed by the NIC driver) to the physical layer interface, such as a media-independent interface (MII) (e.g., a gigabit media-independent interface (GMII) or serial gigabit media-independent interface (SGMII)). The tail pointer is advanced by the NIC driver whenever it updates the descriptors with address pointers to the fresh data payload. When the tail pointer is ahead of head pointer, the NIC starts fetching the descriptors from the corresponding transfer ring buffer (TRB) and stores them in its local prefetch buffer. In the synthetic test, the test software executes the "read time-stamp counter" (RDTSC) instruction just before it updates the tail pointer in the NIC and thus captures the starting point of the data transfer with reference to the time stamp counter clock. The NIC fetches the descriptor, parses it, and then initiates DMA for fetching the data payload from memory.

Once the data payload is available in the local memory the NIC (e.g., local SRAM), the MAC packetizes the data and transmits it on the physical layer interface (e.g., a GMII interface). At this point, the MAC records a timestamp with respect to the PTP clock. The packet transmit time is calculated based on the time difference between the tail pointer update (e.g., based on the TSC clock) and the transmission via the physical layer/GMII interface (e.g., based on the PTP timestamp). Similarly, the jitter is calculated by subtracting the scheduled launch time from actual launch time (e.g., based on the TSC clock and PTP clock, respectively) and posted to a register. There are several issues with this approach.

First, the packet latency is measured using a synthetic workload and synthetic test procedure, which is not identical to customer infield applications. The real-time packet latencies are greatly affected by the workload, interference, and real-time traffic patterns, but it is often difficult to reproduce the customer real-time failures in the lab. Also, since several resources are shared (e.g., CPU core, memory/cache, fabric), these synthetic tests will not provide accurate measurements of packet latencies.

Second, the measurement is done from the tail pointer update, which is highly inaccurate for two reasons. The first reason is the NIC does not parse the descriptor immediately after fetching. The descriptors are stored in a prefetch cache inside the NIC until it is time to parse the descriptor and fetch data payload. The second reason is descriptors are prefetched in bursts, meaning descriptors are not fetched one by one. For example, the MAC layer makes a burst request that is equal to the head pointer minus the tail pointer. To overcome this, in the test procedure prefetching is turned off and the tail pointer is incremented just one descriptor at a time. By doing this, the packets will now be transmitted infrequently, and latencies associated with back-to-back packet pressure, head-of-the-line blocking, limited availability of outstanding credits, limited prefetch cache, and several other hardware specific limitations are not considered. As a result, the measurements provide overly optimistic latency values, which makes it difficult to catch or identify the outliers.

Third, the software uses a different clock than the NIC. For example, the software uses an application clock that corresponds to the time stamp counter (TSC) of the SoC, while the NIC uses a Precision Time Protocol (PTP) clock. As a result, there is some discrepancy between the clocks that needs to be accounted for.

Due to these issues, the current methods are inaccurate and cannot guarantee the level of accuracy or reliability required for very low cycle time and hard real-time industrial applications (e.g., nine 9's of accuracy, or 99.9999999%).

Thus, there are no known solutions available for monitoring hardware specific real-time latencies and jitter at runtime.

Accordingly, this disclosure present a solution for monitoring packet latency and jitter in real time with high precision. The proposed solution uses the PTP clock in the NIC to eliminate the inaccuracies resulting from the use of different clock domains. The NIC hardware measures the packet latencies and jitter precisely and updates the descriptors with the transmit latency, the launch time jitter, and the transmit timestamp for each packet transmission. There is no need for any synthetic workloads nor synthetic tests. Moreover, the monitoring is performed in real time when an application is running.

For example, the packet latencies and jitter for each packet are computed by the NIC and updated in newly defined fields in the transmit descriptor named "transmit latency" and "transmit jitter," along with timestamp corresponding to when the packet was transmitted, as shown in FIG. 7, which illustrates an example of the transmit descriptor write-back format. The NIC computes packet jitter by subtracting the scheduled launch time from the actual launch time, and the resulting jitter value is then written back into the descriptor.

The software can read these latencies and jitter along with other status bits to know if the packet has been transmitted at a scheduled time and within the required launch time window. The proposed architecture also provides statistics on minimum, average, and maximum latencies values across several packets in real-time across $10^9$ samples to obtain the worst-case number reliably.

The proposed architecture provides a real-time monitoring technique for time-sensitive industrial applications and greatly reduces the burden of managing real-time networks by providing an extension to the existing RMON standards. The proposed solution precisely measures hardware packet latencies and launch time jitter at runtime under real application conditions. For example, the latency and jitter fields are embedded inside the descriptor itself, and the NIC precisely measures and writes back these values for each packet when the NIC closes the descriptors.

The proposed method provides more reliable runtime statistics, which are needed for hard real-time applications. For example, the proposed solution provides more reliable data and can guarantee up to nine 9's of accuracy (e.g., 99.9999999% accuracy), which is required for very low cycle time and hard real-time industrial applications.

Moreover, there is no need for additional software to implement this technique. The NIC driver can read the runtime performance statistics and provide them to the application software, which can use this information for course correction in real time.

Another advantage of this solution is that it significantly reduces additional testing costs for both developers and customers of NICs that leverage this solution. For example, NIC developers spend a significant amount of time and resources collecting real-time performance data, which can be greatly simplified with this solution.

Figure 6:
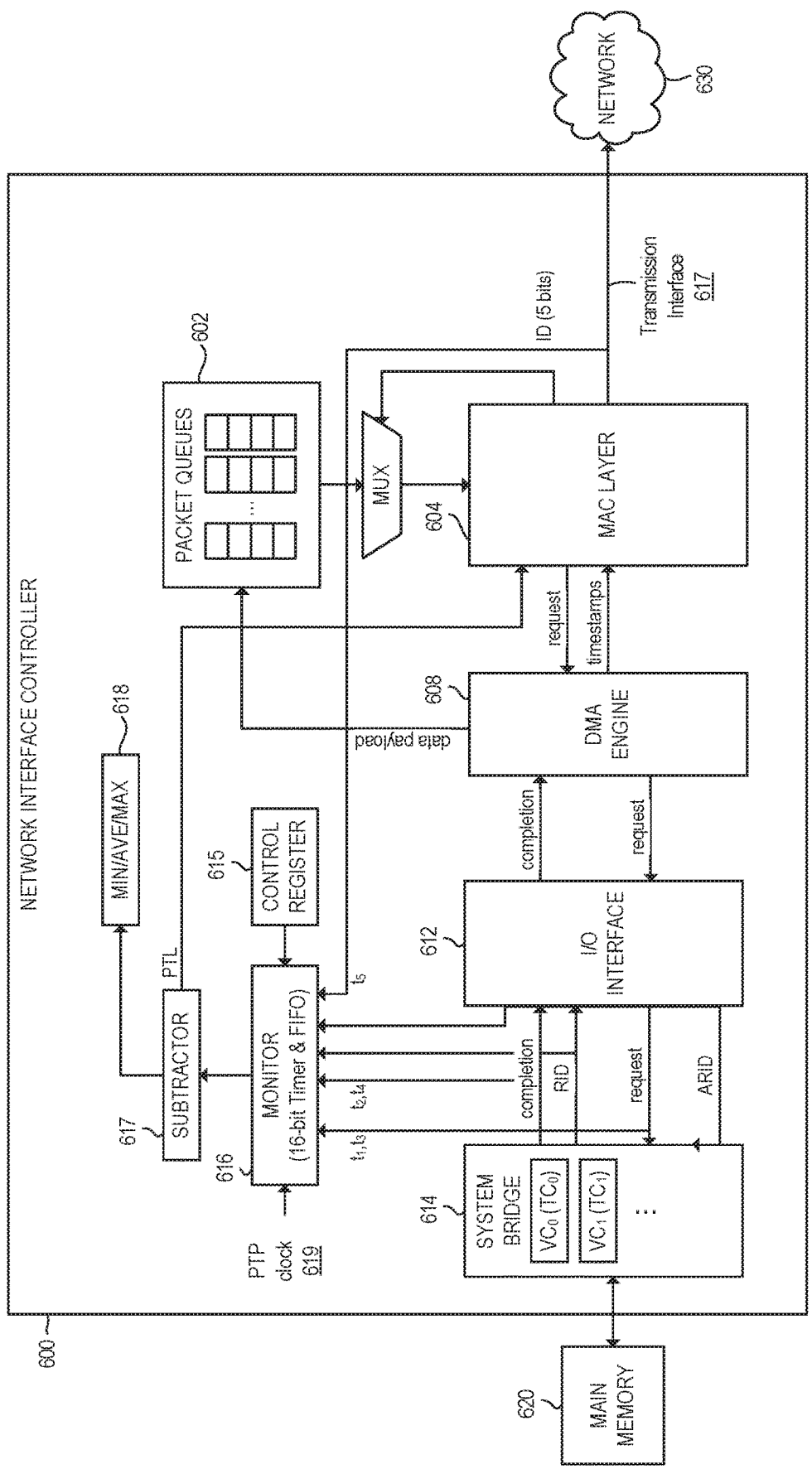
FIG. 6 illustrates an example embodiment of a network interface controller with high-precision real-time performance monitoring for packet transmissions.

FIG. 6 illustrates an example embodiment of a network interface controller 600 with high-precision real-time performance monitoring for packet transmissions. In some embodiments, for example, NIC 600 may be used to monitor the latency and jitter of packet transmissions in real time with high very precision for TSN applications. Moreover, in some embodiments, the solution implemented on NIC 600 may be implemented on other NIC embodiments described throughout this disclosure (e.g., NIC 100 of FIG. 1, NIC 200 of FIG. 2, and/or NIC 400 of FIG. 4).

In the illustrated embodiment, NIC 600 includes multiple transmit and receive queues 602 and the data traffic is segregated into these queues 602 based on VLAN ID (virtual LAN identifier). These queues 602 are internally mapped to various traffic classes based on the priority to provide QoS.

For example, express packets with high priority may be tagged with a particular VLAN ID and mapped to queue 0, and queue 0 may be mapped to traffic class 1 ($TC_1$). Moreover, the data flow mapped to traffic class 1 ($TC_1$) may be routed over virtual channel 1 ($TC_1$), which may be reserved for real-time traffic. The VLAN to traffic class (TC) to virtual channel (VC) mapping provides a low latency path for the time-sensitive real-time packet data throughout the host computing system or SoC associated with NIC 600 (e.g., via I/O interface 612, system bridge 614, and main memory 620). Thus, this mapping ensures the QoS of a packet all the way from the application to the Ethernet wires.

Similarly, best-effort traffic with low priority may be tagged with a different VLAN ID and mapped to queue 1, and queue 1 may be mapped to traffic class 0 ($TC_0$) and routed over virtual channel 0 ($VC_0$), which may be shared with numerous other I/O devices. The best-effort traffic is used for non-time-critical traffic and the latencies are not guaranteed.

Since the latencies vary across different queues 602 dramatically, in order to monitor packets precisely at runtime, it is essential to tag these packets with a unique transaction ID. FIG. 8A illustrates an example of the transaction encoding scheme. This encoding scheme provides the ability to uniquely identify a packet based on queue or channel number, type of data (e.g., descriptor or data payload), and type of transaction (e.g., transmit (Tx) or receive (Rx) transaction or upstream read or write transaction). FIG. 8B illustrates examples of various encoded transactions based on the encoding scheme of FIG. 8A, as discussed further below.

In NIC 600, the monitoring logic 616 houses a free-running 16-bit timer that runs on the NIC PTP clock 619. For a PTP clock at 250 MHz, this timer can measure latencies up to 256 microseconds (μs). The monitoring logic 616 looks at each upstream transaction and decodes the transaction based on the ARID and RID.

For example, when an upstream descriptor read on channel 0 is initiated, the monitor 616 identifies this transaction with ARID of 5'b00010 and takes a snapshot of the PTP timestamp at time '$t_1$' and the state machine waits for the completion. When the completion arrives at the NIC 600, the monitor logic 616 identifies the corresponding queue 0 descriptor completion with RID with the same value of 5'b00010 and takes another snapshot of the PTP timestamp at time '$t_2$' and stores it in a first-in first-out (FIFO) buffer.

Upon receiving the descriptor, the MAC 604 parses the descriptor and schedules DMA (e.g., via DMA engine 608) for the packet payload. Since the new encoding scheme has the ability to distinguish between descriptors and data, now the upstream data transaction on the same channel 0 is initiated with ARID of 5'b00011. Now, the monitor block 616 takes another PTP timestamp at time '$t_3$' and stores that timestamp in a FIFO and the state machine waits for the completion. When the completion corresponding to the channel 0 data payload arrives at NIC 600, the monitoring block 616 identifies this transaction with the same ID value of 5'b00011 and takes a PTP timestamp at time '$t_4$' and pushes the timestamp into a FIFO.

Transactions can go on different virtual channels and at different times due to various priorities and depending on the launch time. Also, the completions may come in out of order based on which virtual channel (VC) the queue is mapped to. Various factors can affect the latencies and thus the packet timestamp values, including upstream outstanding credits, packet size, burst size, number of queues, and so forth.

Once the data payload is received by the MAC 604, the MAC 604 stores the data in the local packet buffer 602 and creates a frame packet and transmits it on the physical layer interface 617 (e.g., GMII) to the physical coding sublayer (PCS) and Serializer/Deserializer (SerDes) to finally send it on to serial wire. When the MAC 604 transmits the packet on the physical layer interface 617 (e.g., GMII) (over network 630), the monitor 616 takes another timestamp at '$t_5$'.

Based on the CTL bit in the descriptor (e.g., via control register 615), the monitor logic 616 calculates the packet latency (e.g., using subtractor 617) based on the following equation:

Packet Transmit Latency (PTL)=CTL*(descriptor($t_2$−$t_1$)+parsing($t_3$−$t_2$))+data($t_4$−$t_3$)+xmt($t_5$−$t_4$)

The monitoring logic 616 also computes launch time jitter by subtracting the scheduled launch time from actual launch time ($t_5$) (e.g., using subtractor 617), as shown by the following equation:

Launch Time Jitter (LTJ)=actual launch time ($t_5$)−scheduled launch time ($t_5'$)

For example, the subtractor logic 617 reads timestamps $t_1$ through $t_5$ from the FIFO of the monitor 616 for a given channel and computes the transmit latency and transmit jitter based on the control bits and the equations noted above.

The monitoring logic 616 then sends the packet transmit latency and launch time jitter values to the MAC layer 604, which internally updates the descriptor fields by closing the descriptor at a later time.

Each transmit channel/queue will have a separate FIFO to store its packet timestamps. The min/ave/max logic 618 computes minimum, average, and maximum packet latency values over all the past transmitted packets. Typically, the average value will be close to the minimum value barring a few outliers at the tail end.

Figure 9:
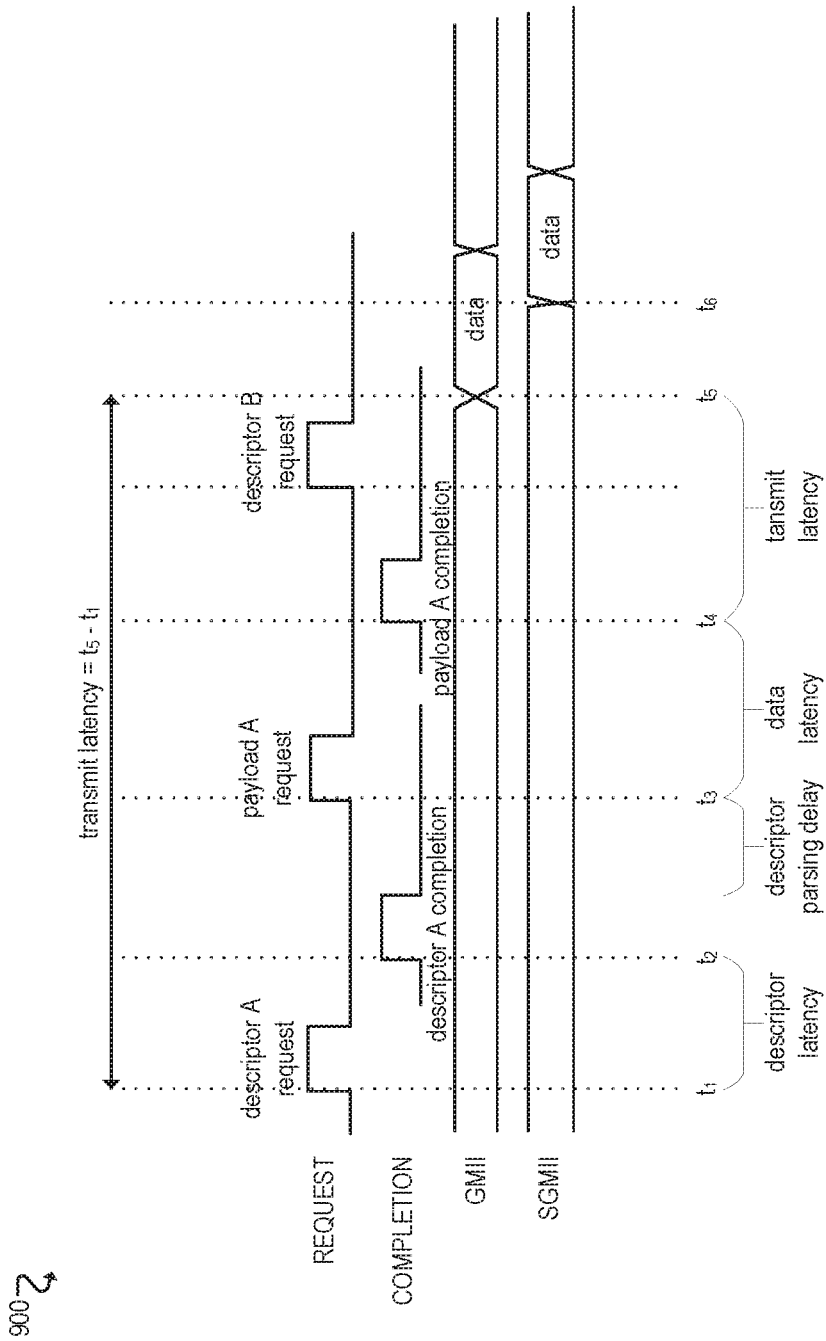
FIG. 9 illustrates a graph of the packet transmit latency for a sequence of operations performed to transmit a packet.

FIG. 9 illustrates a graph 900 of the packet transmit latency for a sequence of operations performed to transmit a packet. For example, graph 900 shows the sequence of operations that occur during a packet transmission (e.g., descriptor request, descriptor completion, payload request, payload completion, data transmission), the latency of each operation, and the overall latency of the entire packet transmission. The packet jitter is calculated based on the launch time specified in the transmit descriptor and the actual time $t_5$ when the packet has been transmitted. The application software can read the descriptors and status registers to determine the root cause of the timing outliers and fine tune the operation of the system as appropriate, such as the resource utilization, workload, interference traffic, change scheduling, and so forth.

Figure 10:
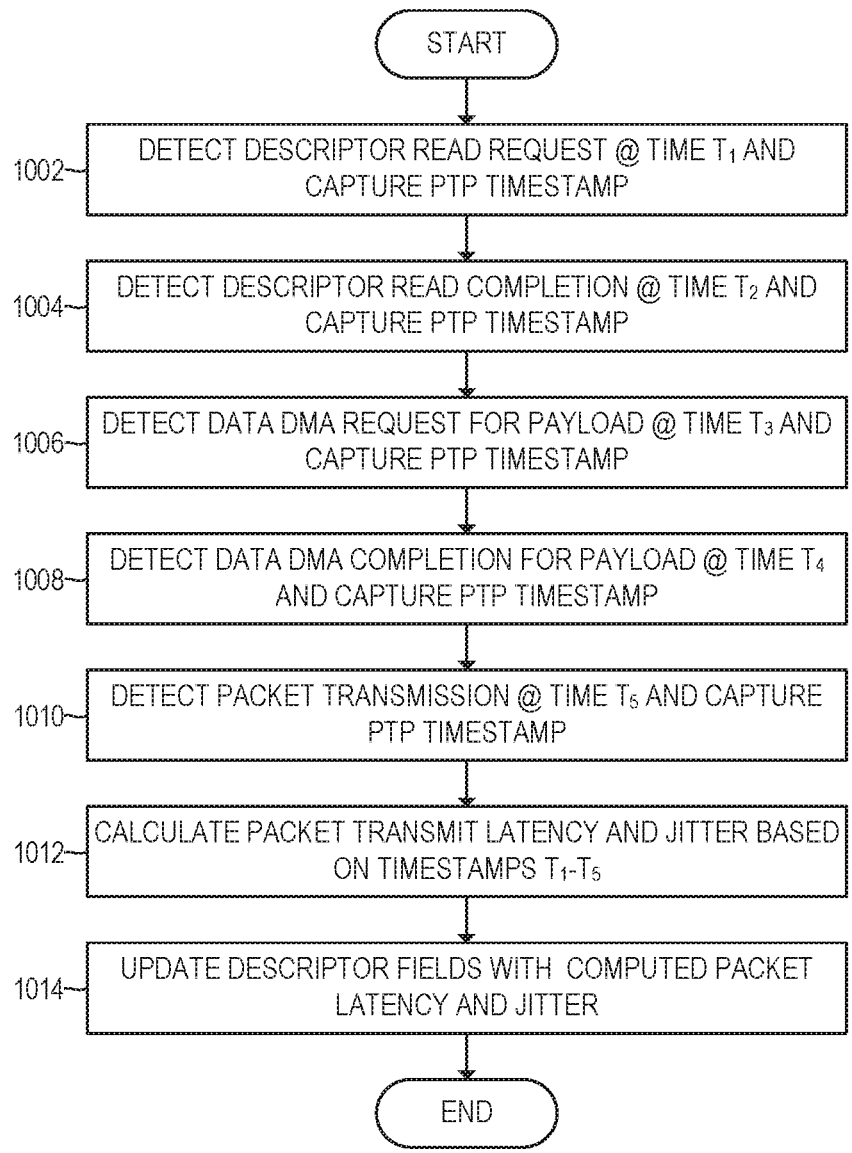
FIG. 10 illustrates a flowchart for performing high-precision real-time performance monitoring for packet transmissions on a network interface controller (NIC) in accordance with various embodiments.

FIG. 10 illustrates a flowchart 1000 for performing high-precision real-time performance monitoring for packet transmissions on a network interface controller (NIC) in accordance with various embodiments. In various embodiments, for example, flowchart 1000 may be implemented and/or performed using NIC 600 of FIG. 6 and/or any other network interface controllers, computing devices, platforms, systems, and environments described throughout this disclosure.

The flowchart begins at block 1002, where a descriptor read request is detected at time $t_1$ and a corresponding PTP timestamp is captured.

The flowchart then proceeds to block 1004, where a descriptor read completion is detected at time $t_2$ and a corresponding PTP timestamp is captured.

The flowchart then proceeds to block 1006, where a data DMA request for the descriptor payload is detected at time $t_3$ and a corresponding PTP timestamp is captured.

The flowchart then proceeds to block 1008, where a data DMA completion for the descriptor payload is detected at time $t_4$ and a corresponding PTP timestamp is captured.

The flowchart then proceeds to block 1010, where a packet transmission is detected at time is and a corresponding PTP timestamp is captured.

The flowchart then proceeds to block 1012 to calculate the packet transmit latency and jitter based on timestamps $t_1$-$t_5$, and then to block 1014 to update the descriptor fields with the packet latency and jitter calculations.

At this point, the flowchart may be complete. In some embodiments, however, the flowchart may restart and/or certain blocks may be repeated. For example, in some embodiments, the flowchart may restart at block 1002 to continue monitoring and detecting events associated with packet transmissions and calculating latency and jitter for the packet transmissions.

Example Computing Environments

The following section presents examples of various computing devices, platforms, systems, and environments that may be used to implement, or may be implemented with, the time sensitive networking functionality described throughout this disclosure.

Figure 11:
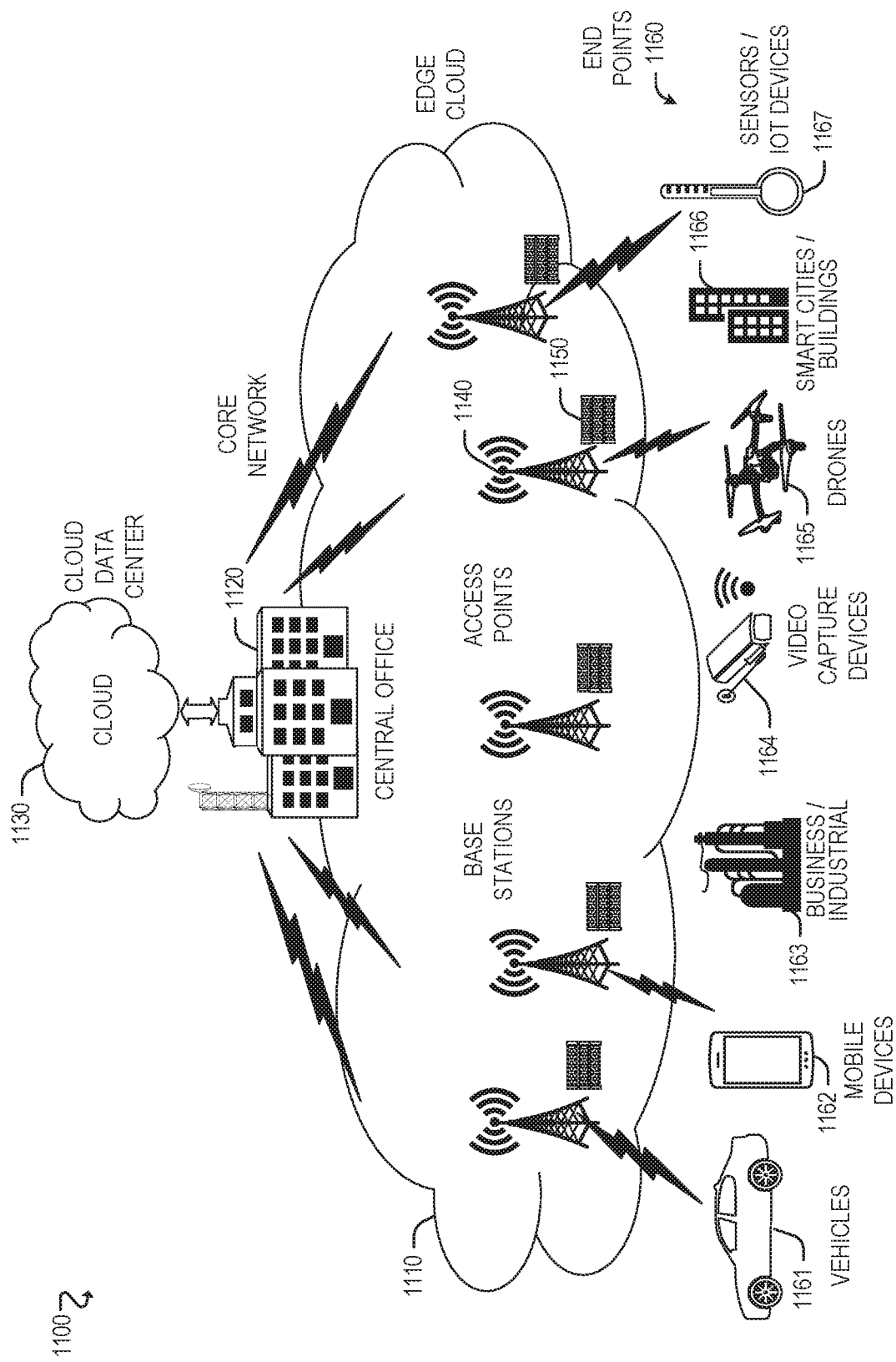
FIG. 11 illustrates an overview of an edge cloud configuration for edge computing.

FIG. 11 is a block diagram 1100 showing an overview of a configuration for edge computing, which includes a layer of processing referred to in many of the following examples as an "edge cloud". As shown, the edge cloud 1110 is co-located at an edge location, such as an access point or base station 1140, a local processing hub 1150, or a central office 1120, and thus may include multiple entities, devices, and equipment instances. The edge cloud 1110 is located much closer to the endpoint (consumer and producer) data sources 1160 (e.g., autonomous vehicles 1161, user equipment 1162, business and industrial equipment 1163, video capture devices 1164, drones 1165, smart cities and building devices 1166, sensors and IoT devices 1167, etc.) than the cloud data center 1130. Compute, memory, and storage resources which are offered at the edges in the edge cloud 1110 are critical to providing ultra-low latency response times for services and functions used by the endpoint data sources 1160 as well as reduce network backhaul traffic from the edge cloud 1110 toward cloud data center 1130 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 12:
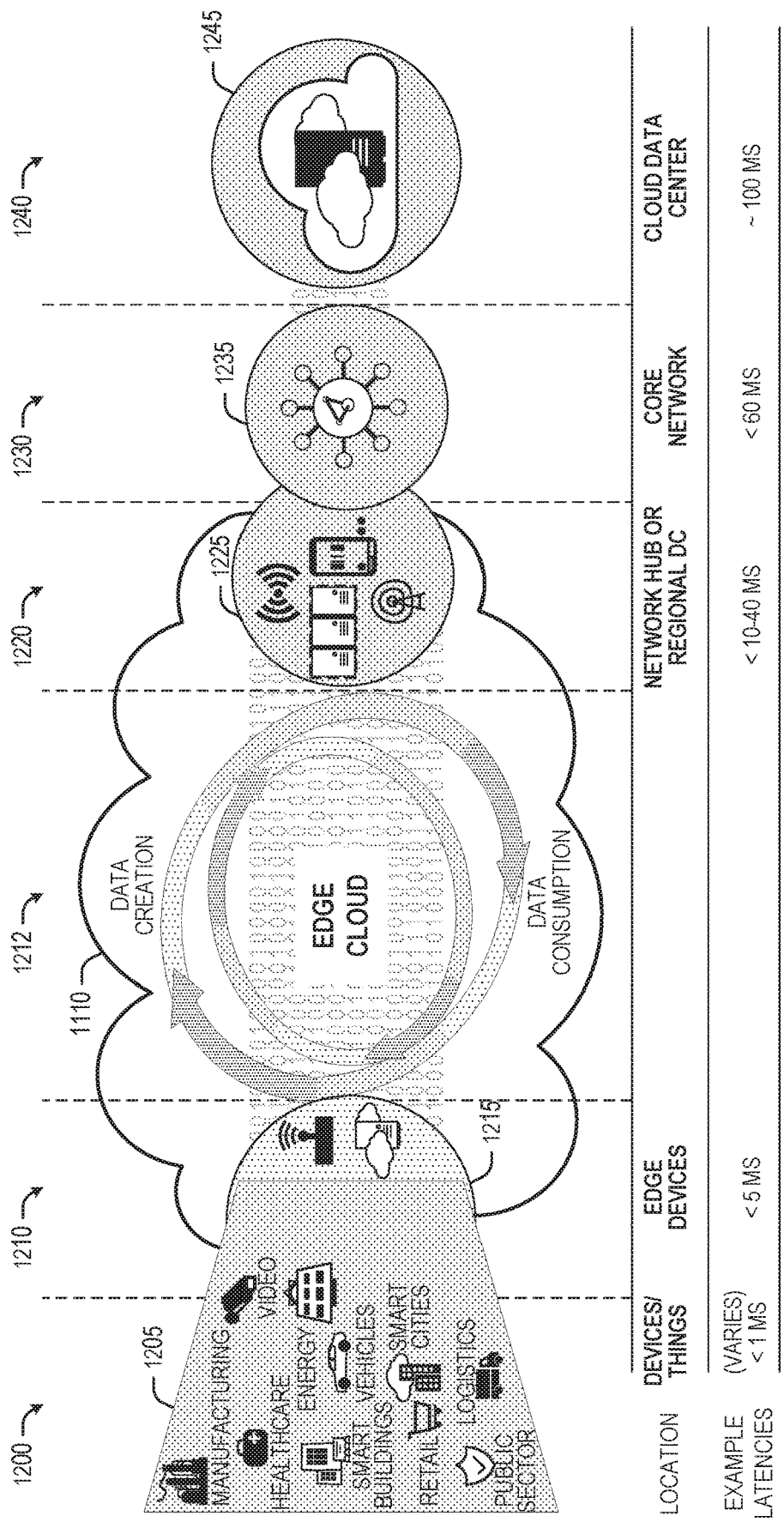
FIG. 12 illustrates operational layers among endpoints, an edge cloud, and cloud computing environments.

FIG. 12 illustrates operational layers among endpoints, an edge cloud, and cloud computing environments. Specifically, FIG. 12 depicts examples of computational use cases 1205, utilizing the edge cloud 1110 among multiple illustrative layers of network computing. The layers begin at an endpoint (devices and things) layer 1200, which accesses the edge cloud 1110 to conduct data creation, analysis, and data consumption activities. The edge cloud 1110 may span multiple network layers, such as an edge devices layer 1210 having gateways, on-premise servers, or network equipment (nodes 1215) located in physically proximate edge systems; a network access layer 1220, encompassing base stations, radio processing units, network hubs, regional data centers (DC), or local network equipment (equipment 1225); and any equipment, devices, or nodes located therebetween (in layer 1212, not illustrated in detail). The network communications within the edge cloud 1110 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 1200, under 5 ms at the edge devices layer 1210, to even between 10 to 40 ms when communicating with nodes at the network access layer 1220. Beyond the edge cloud 1110 are core network 1230 and cloud data center 1240 layers, each with increasing latency (e.g., between 50-60 ms at the core network layer 1230, to 100 or more ms at the cloud data center layer). As a result, operations at a core network data center 1235 or a cloud data center 1245, with latencies of at least 50 to 100 ms or more, will not be able to accomplish many time-critical functions of the use cases 1205. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 1235 or a cloud data center 1245, a central office or content data network may be considered as being located within a "near edge" layer ("near" to the cloud, having high latency values when communicating with the devices and endpoints of the use cases 1205), whereas an access point, base station, on-premise server, or network gateway may be considered as located within a "far edge" layer ("far" from the cloud, having low latency values when communicating with the devices and endpoints of the use cases 1205). It will be understood that other categorizations of a particular network layer as constituting a "close", "local", "near", "middle", or "far" edge may be based on latency, distance, number of network hops, or other measurable characteristics, as measured from a source in any of the network layers 1200-1240.

The various use cases 1205 may access resources under usage pressure from incoming streams, due to multiple services utilizing the edge cloud. To achieve results with low latency, the services executed within the edge cloud 1110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 1110 may provide the ability to serve and respond to multiple applications of the use cases 1205 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 1110 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 1110 (network layers 1200-1240), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 1110.

As such, the edge cloud 1110 is formed from network components and functional features operated by and within edge gateway nodes, edge aggregation nodes, or other edge compute nodes among network layers 1210-1230. The edge cloud 1110 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 1110 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 1110 may be servers, multi-tenant servers, appliance computing devices, and/or any other type of computing devices. For example, the edge cloud 1110 may include an appliance computing device that is a self-contained electronic device including a housing, a chassis, a case or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 14. The edge cloud 1110 may also include one or more servers and/or one or more multi-tenant servers. Such a server may include an operating system and a virtual computing environment. A virtual computing environment may include a hypervisor managing (spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 13:
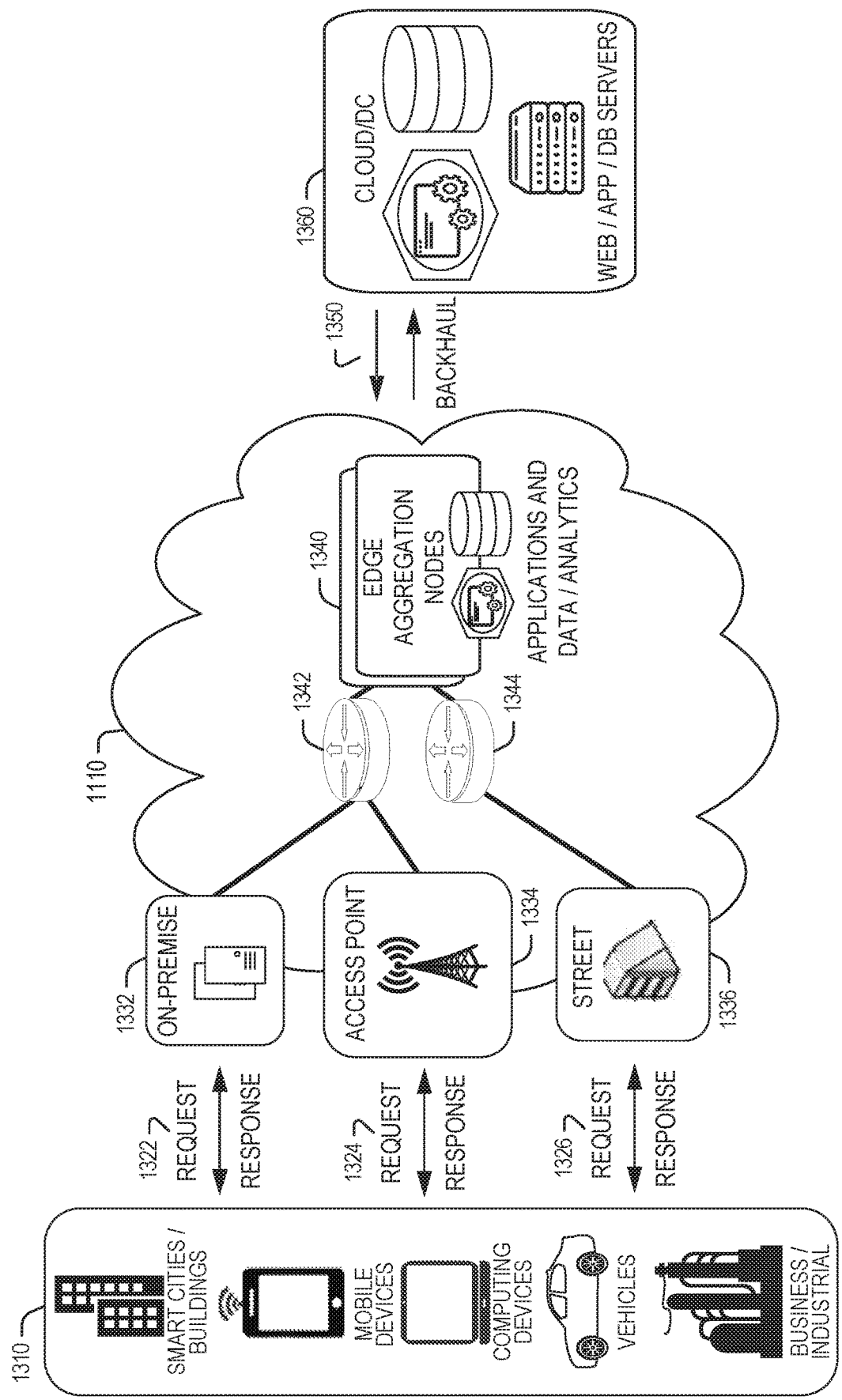
FIG. 13 illustrates an example approach for networking and services in an edge computing system.

In FIG. 13, various client endpoints 1310 (in the form of mobile devices, computers, autonomous vehicles, business computing equipment, industrial processing equipment) exchange requests and responses that are specific to the type of endpoint network aggregation. For instance, client endpoints 1310 may obtain network access via a wired broadband network, by exchanging requests and responses 1322 through an on-premise network system 1332. Some client endpoints 1310, such as mobile computing devices, may obtain network access via a wireless broadband network, by exchanging requests and responses 1324 through an access point (e.g., cellular network tower) 1334. Some client endpoints 1310, such as autonomous vehicles may obtain network access for requests and responses 1326 via a wireless vehicular network through a street-located network system 1336. However, regardless of the type of network access, the TSP may deploy aggregation points 1342, 1344 within the edge cloud 1110 to aggregate traffic and requests. Thus, within the edge cloud 1110, the TSP may deploy various compute and storage resources, such as at edge aggregation nodes 1340, to provide requested content. The edge aggregation nodes 1340 and other systems of the edge cloud 1110 are connected to a cloud or data center 1360, which uses a backhaul network 1350 to fulfill higher-latency requests from a cloud/data center for websites, applications, database servers, etc. Additional or consolidated instances of the edge aggregation nodes 1340 and the aggregation points 1342, 1344, including those deployed on a single server framework, may also be present within the edge cloud 1110 or other areas of the TSP infrastructure.

Figure 14:
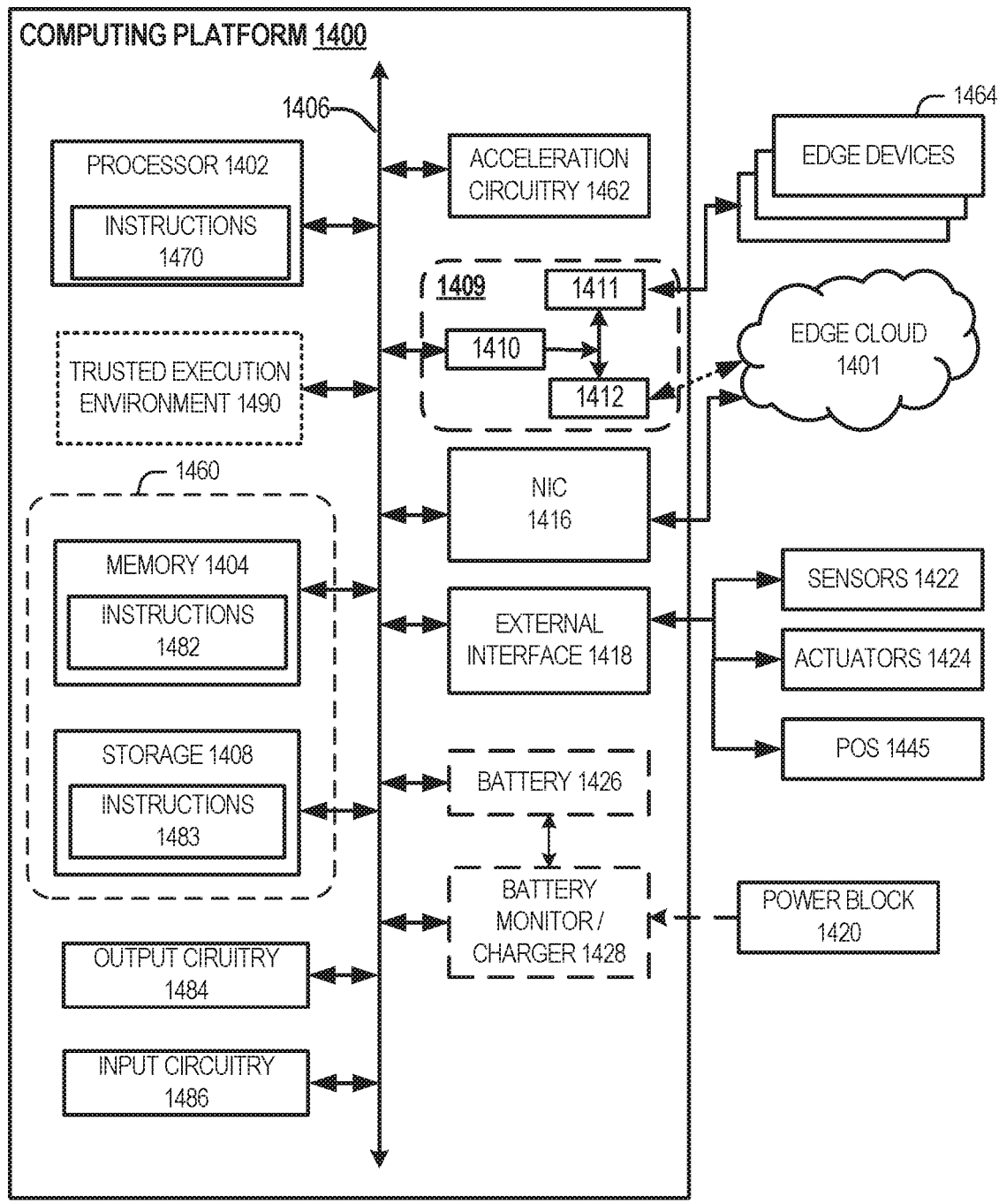
FIG. 14 illustrates an example computing platform in accordance with various embodiments.

FIG. 14 illustrates an example of a computing platform 1400 (also referred to as "system 1400," "device 1400," "appliance 1400," or the like) in accordance with various embodiments. In various embodiments, computing platform 1400 may be implemented with, or may be used to implement, the time sensitive networking (TSN) functionality described throughout this disclosure. In some embodiments, for example, network interface controller (NIC) 1416 of computing platform 1400 may be implemented with some or all of the TSN functionality of NICs 100, 200, 400, and/or 600 of FIGS. 1, 2, 4, and 6, respectively.

In various embodiments, the platform 1400 may be suitable for use as any other element/device discussed herein with regard any other figure shown and described herein. Platform 1400 may also be implemented in or as a server computer system or some other element, device, or system discussed herein. The platform 1400 may include any combinations of the components shown in the example. The components of platform 1400 may be implemented as integrated circuits (ICs), portions thereof, discrete electronic devices, or other modules, logic, hardware, software, firmware, or a combination thereof adapted in the computer platform 1400, or as components otherwise incorporated within a chassis of a larger system. The example of FIG. 14 is intended to show a high level view of components of the computer platform 1400. However, some of the components shown may be omitted, additional components may be present, and different arrangement of the components shown may occur in other implementations.

The platform 1400 includes processor circuitry 1402. The processor circuitry 1402 includes circuitry such as, but not limited to one or more processor cores and one or more of cache memory, low drop-out voltage regulators (LDOs), interrupt controllers, serial interfaces such as SPI, I2C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 1402 may include one or more hardware accelerators, which may be microprocessors, programmable processing devices (e.g., FPGA, ASIC, etc.), or the like. The one or more hardware accelerators may include, for example, computer vision and/or deep learning accelerators. In some implementations, the processor circuitry 1402 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of processor circuitry 1402 may include, for example, one or more processor cores (CPUs), application processors, GPUs, RISC processors, Acorn RISC Machine (ARM) processors, CISC processors, one or more DSPs, one or more FPGAs, one or more PLDs, one or more ASICs, one or more baseband processors, one or more radio-frequency integrated circuits (RFIC), one or more microprocessors or controllers, or any suitable combination thereof. The processors (or cores) of the processor circuitry 1402 may be coupled with or may include memory/storage and may be configured to execute instructions stored in the memory/storage to enable various applications or operating systems to run on the platform 1400. In these embodiments, the processors (or cores) of the processor circuitry 1402 is configured to operate application software to provide a specific service to a user of the platform 1400. In some embodiments, the processor circuitry 1402 may be a special-purpose processor/controller to operate according to the various embodiments herein.

As examples, the processor circuitry 1402 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, Calif. However, any number other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centriq™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.;

or the like. In some implementations, the processor circuitry 1402 may be a part of a system on a chip (SoC), System-in-Package (SiP), a multi-chip package (MCP), and/or the like, in which the processor circuitry 1402 and other components are formed into a single integrated circuit, or a single package, such as the Edison™ or Galileo™ SoC boards from Intel® Corporation. Other examples of the processor circuitry 1402 are mentioned elsewhere in the present disclosure.

Additionally or alternatively, processor circuitry 1402 may include circuitry such as, but not limited to, one or more FPDs such as FPGAs and the like; PLDs such as CPLDs, HCPLDs, and the like; ASICs such as structured ASICs and the like; PSoCs; and the like. In such embodiments, the circuitry of processor circuitry 1402 may comprise logic blocks or logic fabric including and other interconnected resources that may be programmed to perform various functions, such as the procedures, methods, functions, etc. of the various embodiments discussed herein. In such embodiments, the circuitry of processor circuitry 1402 may include memory cells (e.g., EPROM, EEPROM, flash memory, static memory (e.g., SRAM, anti-fuses, etc.) used to store logic blocks, logic fabric, data, etc. in LUTs and the like.

The processor circuitry 1402 may communicate with system memory circuitry 1404 over an interconnect 1406 (e.g., a bus). Any number of memory devices may be used to provide for a given amount of system memory. As examples, the memory circuitry 1404 may be random access memory (RAM) in accordance with a Joint Electron Devices Engineering Council (JEDEC) design such as the DDR or mobile DDR standards (e.g., LPDDR, LPDDR2, LPDDR3, or LPDDR4), dynamic RAM (DRAM), and/or synchronous DRAM (SDRAM)). The memory circuitry 1404 may also include nonvolatile memory (NVM) such as high-speed electrically erasable memory (commonly referred to as "flash memory"), phase change RAM (PRAM), resistive memory such as magnetoresistive random access memory (MRAM), etc., and may incorporate three-dimensional (3D) cross-point (XPOINT) memories from Intel® and Micron®. The memory circuitry 1404 may also comprise persistent storage devices, which may be temporal and/or persistent storage of any type, including, but not limited to, non-volatile memory, optical, magnetic, and/or solid state mass storage, and so forth.

The individual memory devices of memory circuitry 1404 may be implemented as one or more of solder down packaged integrated circuits, socketed memory modules, and plug-in memory cards. The memory circuitry 1404 may be implemented as any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. In embodiments, the memory circuitry 1404 may be disposed in or on a same die or package as the processor circuitry 1402 (e.g., a same SoC, a same SiP, or soldered on a same MCP as the processor circuitry 1402).

To provide for persistent storage of information such as data, applications, operating systems (OS), and so forth, a storage circuitry 1408 may also couple to the processor circuitry 1402 via the interconnect 1406. In an example, the storage circuitry 1408 may be implemented via a solid-state disk drive (SSDD). Other devices that may be used for the storage circuitry 1408 include flash memory cards, such as SD cards, microSD cards, xD picture cards, and the like, and USB flash drives. In low power implementations, the storage circuitry 1408 may be on-die memory or registers associated with the processor circuitry 1402. However, in some examples, the storage circuitry 1408 may be implemented using a micro hard disk drive (HDD). Further, any number of new technologies may be used for the storage circuitry 1408 in addition to, or instead of, the technologies described, such resistance change memories, phase change memories, holographic memories, or chemical memories, among others.

The storage circuitry 1408 store computational logic 1483 (or "modules 1483") in the form of software, firmware, or hardware commands to implement the techniques described herein. The computational logic 1483 may be employed to store working copies and/or permanent copies of computer programs, or data to create the computer programs, for the operation of various components of platform 1400 (e.g., drivers, etc.), an OS of platform 1400 and/or one or more applications for carrying out the embodiments discussed herein. The computational logic 1483 may be stored or loaded into memory circuitry 1404 as instructions 1482, or data to create the instructions 1482, for execution by the processor circuitry 1402 to provide the functions described herein. The various elements may be implemented by assembler instructions supported by processor circuitry 1402 or high-level languages that may be compiled into such instructions (e.g., instructions 1470, or data to create the instructions 1470). The permanent copy of the programming instructions may be placed into persistent storage devices of storage circuitry 1408 in the factory or in the field through, for example, a distribution medium (not shown), through a communication interface (e.g., from a distribution server (not shown)), or over-the-air (OTA).

In an example, the instructions 1482 provided via the memory circuitry 1404 and/or the storage circuitry 1408 of FIG. 14 are embodied as one or more non-transitory computer readable storage media (see e.g., NTCRSM 1460) including program code, a computer program product or data to create the computer program, with the computer program or data, to direct the processor circuitry 1402 of platform 1400 to perform electronic operations in the platform 1400, and/or to perform a specific sequence or flow of actions, for example, as described with respect to the flowchart(s) and block diagram(s) of operations and functionality depicted previously. The processor circuitry 1402 accesses the one or more non-transitory computer readable storage media over the interconnect 1406.

In alternate embodiments, programming instructions (or data to create the instructions) may be disposed on multiple NTCRSM 1460. In alternate embodiments, programming instructions (or data to create the instructions) may be disposed on computer-readable transitory storage media, such as, signals. The instructions embodied by a machine-readable medium may further be transmitted or received over a communications network using a transmission medium via a network interface device utilizing any one of a number of transfer protocols (e.g., HTTP). Any combination of one or more computer usable or computer readable medium(s) may be utilized. The computer-usable or computer-readable medium may be, for example but not limited to, one or more electronic, magnetic, optical, electromagnetic, infrared, or semiconductor systems, apparatuses, devices, or propagation media. For instance, the NTCRSM

1460 may be embodied by devices described for the storage circuitry 1408 and/or memory circuitry 1404. More specific examples (a non-exhaustive list) of a computer-readable medium would include the following: an electrical connection having one or more wires, a portable computer diskette, a hard disk, a random access memory (RAM), a read-only memory (ROM), an erasable programmable read-only memory (EPROM, Flash memory, etc.), an optical fiber, a portable compact disc read-only memory (CD-ROM), an optical storage device and/or optical disks, a transmission media such as those supporting the Internet or an intranet, a magnetic storage device, or any number of other hardware devices. Note that the computer-usable or computer-readable medium could even be paper or another suitable medium upon which the program (or data to create the program) is printed, as the program (or data to create the program) can be electronically captured, via, for instance, optical scanning of the paper or other medium, then compiled, interpreted, or otherwise processed in a suitable manner, if necessary, and then stored in a computer memory (with or without having been staged in or more intermediate storage media). In the context of this document, a computer-usable or computer-readable medium may be any medium that can contain, store, communicate, propagate, or transport the program (or data to create the program) for use by or in connection with the instruction execution system, apparatus, or device. The computer-usable medium may include a propagated data signal with the computer-usable program code (or data to create the program code) embodied therewith, either in baseband or as part of a carrier wave. The computer usable program code (or data to create the program) may be transmitted using any appropriate medium, including but not limited to wireless, wireline, optical fiber cable, RF, etc.

In various embodiments, the program code (or data to create the program code) described herein may be stored in one or more of a compressed format, an encrypted format, a fragmented format, a packaged format, etc. Program code (or data to create the program code) as described herein may require one or more of installation, modification, adaptation, updating, combining, supplementing, configuring, decryption, decompression, unpacking, distribution, reassignment, etc. in order to make them directly readable and/or executable by a computing device and/or other machine. For example, the program code (or data to create the program code) may be stored in multiple parts, which are individually compressed, encrypted, and stored on separate computing devices, wherein the parts when decrypted, decompressed, and combined form a set of executable instructions that implement the program code (the data to create the program code such as that described herein. In another example, the Program code (or data to create the program code) may be stored in a state in which they may be read by a computer, but require addition of a library (e.g., a dynamic link library), a software development kit (SDK), an application programming interface (API), etc. in order to execute the instructions on a particular computing device or other device. In another example, the program code (or data to create the program code) may need to be configured (e.g., settings stored, data input, network addresses recorded, etc.) before the program code (or data to create the program code) can be executed/used in whole or in part. In this example, the program code (or data to create the program code) may be unpacked, configured for proper execution, and stored in a first location with the configuration instructions located in a second location distinct from the first location. The configuration instructions can be initiated by an action, trigger, or instruction that is not co-located in storage or execution location with the instructions enabling the disclosed techniques. Accordingly, the disclosed program code (or data to create the program code) are intended to encompass such machine readable instructions and/or program(s) (or data to create such machine readable instruction and/or programs) regardless of the particular format or state of the machine readable instructions and/or program(s) when stored or otherwise at rest or in transit.

Computer program code for carrying out operations of the present disclosure (e.g., computational logic 1483, instructions 1482, 1470 discussed previously) may be written in any combination of one or more programming languages, including an object oriented programming language such as Python, Ruby, Scala, Smalltalk, Java™, C++, C#, or the like; a procedural programming languages, such as the "C" programming language, the Go (or "Golang") programming language, or the like; a scripting language such as JavaScript, Server-Side JavaScript (SSJS), JQuery, PHP, Pearl, Python, Ruby on Rails, Accelerated Mobile Pages Script (AMPscript), Mustache Template Language, Handlebars Template Language, Guide Template Language (GTL), PHP, Java and/or Java Server Pages (JSP), Node.js, ASP-.NET, JAMscript, and/or the like; a markup language such as Hypertext Markup Language (HTML), Extensible Markup Language (XML), Java Script Object Notion (JSON), Apex®, Cascading Stylesheets (CSS), JavaServer Pages (JSP), MessagePack™, Apache® Thrift, Abstract Syntax Notation One (ASN.1), Google® Protocol Buffers (protobuf), or the like; some other suitable programming languages including proprietary programming languages and/or development tools, or any other languages tools. The computer program code for carrying out operations of the present disclosure may also be written in any combination of the programming languages discussed herein. The program code may execute entirely on the system 1400, partly on the system 1400, as a stand-alone software package, partly on the system 1400 and partly on a remote computer or entirely on the remote computer or server. In the latter scenario, the remote computer may be connected to the system 1400 through any type of network, including a LAN or WAN, or the connection may be made to an external computer (e.g., through the Internet using an Internet Service Provider).

In an example, the instructions 1470 on the processor circuitry 1402 (separately, or in combination with the instructions 1482 and/or logic/modules 1483 stored in computer-readable storage media) may configure execution or operation of a trusted execution environment (TEE) 1490. The TEE 1490 operates as a protected area accessible to the processor circuitry 1402 to enable secure access to data and secure execution of instructions. In some embodiments, the TEE 1490 may be a physical hardware device that is separate from other components of the system 1400 such as a secure-embedded controller, a dedicated SoC, or a tamper-resistant chipset or microcontroller with embedded processing devices and memory devices. Examples of such embodiments include a Desktop and mobile Architecture Hardware (DASH) compliant Network Interface Card (NIC), Intel® Management/Manageability Engine, Intel® Converged Security Engine (CSE) or a Converged Security Management/Manageability Engine (CSME), Trusted Execution Engine (TXE) provided by Intel® each of which may operate in conjunction with Intel® Active Management Technology (AMT) and/or Intel® vPro™ Technology; AMD® Platform Security coProcessor (PSP), AMD® PRO A-Series Accelerated Processing Unit (APU) with DASH manageability, Apple® Secure Enclave coprocessor; IBM®

Crypto Express3®, IBM® 4807, 4808, 4809, and/or 4765 Cryptographic Coprocessors, IBM® Baseboard Management Controller (BMC) with Intelligent Platform Management Interface (IPMI), Dell™ Remote Assistant Card II (DRAC II), integrated Dell™ Remote Assistant Card (iDRAC), and the like.

In other embodiments, the TEE 1490 may be implemented as secure enclaves, which are isolated regions of code and/or data within the processor and/or memory/storage circuitry of the system 1400. Only code executed within a secure enclave may access data within the same secure enclave, and the secure enclave may only be accessible using the secure application (which may be implemented by an application processor or a tamper-resistant microcontroller). Various implementations of the TEE 1490, and an accompanying secure area in the processor circuitry 1402 or the memory circuitry 1404 and/or storage circuitry 1408 may be provided, for instance, through use of Intel® Software Guard Extensions (SGX), ARM® TrustZone® hardware security extensions, Keystone Enclaves provided by Oasis Labs™, and/or the like. Other aspects of security hardening, hardware roots-of-trust, and trusted or protected operations may be implemented in the device 1400 through the TEE 1490 and the processor circuitry 1402.

In some embodiments, the memory circuitry 1404 and/or storage circuitry 1408 may be divided into isolated user-space instances such as containers, partitions, virtual environments (VEs), etc. The isolated user-space instances may be implemented using a suitable OS-level virtualization technology such as Docker® containers, Kubernetes® containers, Solaris® containers and/or zones, OpenVZ® virtual private servers, DragonFly BSD® virtual kernels and/or jails, chroot jails, and/or the like. Virtual machines could also be used in some implementations. In some embodiments, the memory circuitry 1404 and/or storage circuitry 1408 may be divided into one or more trusted memory regions for storing applications or software modules of the TEE 1490.

Although the instructions 1482 are shown as code blocks included in the memory circuitry 1404 and the computational logic 1483 is shown as code blocks in the storage circuitry 1408, it should be understood that any of the code blocks may be replaced with hardwired circuits, for example, built into an FPGA, ASIC, or some other suitable circuitry. For example, where processor circuitry 1402 includes (e.g., FPGA based) hardware accelerators as well as processor cores, the hardware accelerators (e.g., the FPGA cells) may be pre-configured (e.g., with appropriate bit streams) with the aforementioned computational logic to perform some or all of the functions discussed previously (in lieu of employment of programming instructions to be executed by the processor core(s)).

The memory circuitry 1404 and/or storage circuitry 1408 may store program code of an operating system (OS), which may be a general purpose OS or an OS specifically written for and tailored to the computing platform 1400. For example, the OS may be Unix or a Unix-like OS such as Linux e.g., provided by Red Hat Enterprise, Windows10™ provided by Microsoft Corp.®, macOS provided by Apple Inc.®, or the like. In another example, the OS may be a mobile OS, such as Android® provided by Google Inc.®, iOS® provided by Apple Inc.®, Windows 10 Mobile® provided by Microsoft Corp.®, KaiOS provided by KaiOS Technologies Inc., or the like. In another example, the OS may be a real-time OS (RTOS), such as Apache Mynewt provided by the Apache Software Foundation®, Windows 10 For IoT® provided by Microsoft Corp.®, Micro-Controller Operating Systems ("MicroC/OS" or "μC/OS") provided by Micrium®, Inc., FreeRTOS, VxWorks® provided by Wind River Systems, Inc.®, PikeOS provided by Sysgo AG®, Android Things® provided by Google Inc.®, QNX® RTOS provided by BlackBerry Ltd., or any other suitable RTOS, such as those discussed herein.

The OS may include one or more drivers that operate to control particular devices that are embedded in the platform 1400, attached to the platform 1400, or otherwise communicatively coupled with the platform 1400. The drivers may include individual drivers allowing other components of the platform 1400 to interact or control various I/O devices that may be present within, or connected to, the platform 1400. For example, the drivers may include a display driver to control and allow access to a display device, a touchscreen driver to control and allow access to a touchscreen interface of the platform 1400, sensor drivers to obtain sensor readings of sensor circuitry 1421 and control and allow access to sensor circuitry 1421, actuator drivers to obtain actuator positions of the actuators 1422 and/or control and allow access to the actuators 1422, a camera driver to control and allow access to an embedded image capture device, audio drivers to control and allow access to one or more audio devices. The OSs may also include one or more libraries, drivers, APIs, firmware, middleware, software glue, etc., which provide program code and/or software components for one or more applications to obtain and use the data from a secure execution environment, trusted execution environment, and/or management engine of the platform 1400 (not shown).

The components may communicate over the IX 1406. The IX 1406 may include any number of technologies, including ISA, extended ISA, I2C, SPI, point-to-point interfaces, power management bus (PMBus), PCI, PCIe, PCIx, Intel® UPI, Intel® Accelerator Link, Intel® CXL, CAPI, OpenCAPI, Intel® QPI, UPI, Intel® OPA IX, RapidIO™ system IXs, CCIX, Gen-Z Consortium IXs, a HyperTransport interconnect, NVLink provided by NVIDIA®, a Time-Trigger Protocol (TTP) system, a FlexRay system, and/or any number of other IX technologies. The IX 1406 may be a proprietary bus, for example, used in a SoC based system.

The interconnect 1406 couples the processor circuitry 1402 to the communication circuitry 1409 for communications with other devices. The communication circuitry 1409 is a hardware element, or collection of hardware elements, used to communicate over one or more networks (e.g., cloud 1401) and/or with other devices (e.g., mesh devices/fog 1464). The communication circuitry 1409 includes baseband circuitry 1410 (or "modem 1410") and RF circuitry 1411 and 1412.

The baseband circuitry 1410 includes one or more processing devices (e.g., baseband processors) to carry out various protocol and radio control functions. Baseband circuitry 1410 may interface with application circuitry of platform 1400 (e.g., a combination of processor circuitry 1402, memory circuitry 1404, and/or storage circuitry 1408) for generation and processing of baseband signals and for controlling operations of the RF circuitry 1411 or 1412. The baseband circuitry 1410 may handle various radio control functions that enable communication with one or more radio networks via the RF circuitry 1411 or 1412. The baseband circuitry 1410 may include circuitry such as, but not limited to, one or more single-core or multi-core processors (e.g., one or more baseband processors) or control logic to process baseband signals received from a receive signal path of the RF circuitry 1411 and/or 1412, and to generate baseband signals to be provided to the RF circuitry 1411 or 1412 via a transmit signal path. In various embodiments, the baseband circuitry 1410 may implement an RTOS to manage resources of the baseband circuitry 1410, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein.

Although not shown by FIG. 14, in one embodiment, the baseband circuitry 1410 includes individual processing device(s) to operate one or more wireless communication protocols (e.g., a "multi-protocol baseband processor" or "protocol processing circuitry") and individual processing device(s) to implement PHY functions. In this embodiment, the protocol processing circuitry operates or implements various protocol layers/entities of one or more wireless communication protocols. In a first example, the protocol processing circuitry may operate LTE protocol entities and/or 5G/NR protocol entities when the communication circuitry 1409 is a cellular radiofrequency communication system, such as millimeter wave (mmWave) communication circuitry or some other suitable cellular communication circuitry. In the first example, the protocol processing circuitry 1402 would operate MAC, RLC, PDCP, SDAP, RRC, and NAS functions. In a second example, the protocol processing circuitry may operate one or more IEEE-based protocols when the communication circuitry 1409 is WiFi communication system. In the second example, the protocol processing circuitry would operate WiFi MAC and LLC) functions. The protocol processing circuitry may include one or more memory structures (not shown) to store program code and data for operating the protocol functions, as well as one or more processing cores (not shown) to execute the program code and perform various operations using the data. The protocol processing circuitry provides control functions for the baseband circuitry 1410 and/or RF circuitry 1411 and 1412. The baseband circuitry 1410 may also support radio communications for more than one wireless protocol.

Continuing with the aforementioned embodiment, the baseband circuitry 1410 includes individual processing device(s) to implement PHY including HARQ functions, scrambling and/or descrambling, (en)coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, radio frequency shifting, and other related functions. etc. The modulation/demodulation functionality may include Fast-Fourier Transform (FFT), pre-coding, or constellation mapping/demapping functionality. The (en)coding/decoding functionality may include convolution, tail-biting convolution, turbo, Viterbi, or Low Density Parity Check (LDPC) coding. Embodiments of modulation/demodulation and encoder/decoder functionality are not limited to these examples and may include other suitable functionality in other embodiments.

The communication circuitry 1409 also includes RF circuitry 1411 and 1412 to enable communication with wireless networks using modulated electromagnetic radiation through a non-solid medium. Each of the RF circuitry 1411 and 1412 include a receive signal path, which may include circuitry to convert analog RF signals (e.g., an existing or received modulated waveform) into digital baseband signals to be provided to the baseband circuitry 1410. Each of the RF circuitry 1411 and 1412 also include a transmit signal path, which may include circuitry configured to convert digital baseband signals provided by the baseband circuitry 1410 to be converted into analog RF signals (e.g., modulated waveform) that will be amplified and transmitted via an antenna array including one or more antenna elements (not shown). The antenna array may be a plurality of microstrip antennas or printed antennas that are fabricated on the surface of one or more printed circuit boards. The antenna array may be formed in as a patch of metal foil (e.g., a patch antenna) in a variety of shapes, and may be coupled with the RF circuitry 1411 or 1412 using metal transmission lines or the like.

The RF circuitry 1411 (also referred to as a "mesh transceiver") is used for communications with other mesh or fog devices 1464. The mesh transceiver 1411 may use any number of frequencies and protocols, such as 2.4 GHz transmissions under the IEEE 802.15.4 standard, using the Bluetooth® low energy (BLE) standard, as defined by the Bluetooth® Special Interest Group, or the ZigBee® standard, among others. Any number of RF circuitry 1411, configured for a particular wireless communication protocol, may be used for the connections to the mesh devices 1464. For example, a WLAN unit may be used to implement WiFi™ communications in accordance with the IEEE 802.11 standard. In addition, wireless wide area communications, for example, according to a cellular or other wireless wide area protocol, may occur via a WWAN unit.

The mesh transceiver 1411 may communicate using multiple standards or radios for communications at different ranges. For example, the platform 1400 may communicate with close/proximate devices, e.g., within about 10 meters, using a local transceiver based on BLE, or another low power radio, to save power. More distant mesh devices 1464, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

The RF circuitry 1412 (also referred to as a "wireless network transceiver," a "cloud transceiver," or the like) may be included to communicate with devices or services in the cloud 1401 via local or wide area network protocols. The wireless network transceiver 1412 includes one or more radios to communicate with devices in the cloud 1401. The cloud 1401 may be the same or similar to cloud 144 discussed previously. The wireless network transceiver 1412 may be a LPWA transceiver that follows the IEEE 802.15.4, or IEEE 802.15.4g standards, among others, such as those discussed herein. The platform 1400 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 1002.15.4e specification may be used.

Any number of other radio communications and protocols may be used in addition to the systems mentioned for the mesh transceiver 1411 and wireless network transceiver

1412, as described herein. For example, the radio transceivers 1411 and 1412 may include an LTE or other cellular transceiver that uses spread spectrum (SPA/SAS) communications for implementing high-speed communications. Further, any number of other protocols may be used, such as WiFi® networks for medium speed communications and provision of network communications.

The transceivers 1411 and 1412 may include radios that are compatible with, and/or may operate according to any one or more of the following radio communication technologies and/or standards including but not limited to those discussed herein.

Network interface circuitry/controller (NIC) 1416 may be included to provide wired communication to the cloud 1401 or to other devices, such as the mesh devices 1464 using a standard network interface protocol. The standard network interface protocol may include Ethernet, Ethernet over GRE Tunnels, Ethernet over Multiprotocol Label Switching (MPLS), Ethernet over USB, or may be based on other types of network protocols, such as Controller Area Network (CAN), Local Interconnect Network (LIN), DeviceNet, ControlNet, Data Highway+, PROFIBUS, or PROFINET, among many others. Network connectivity may be provided to/from the platform 1400 via NIC 1416 using a physical connection, which may be electrical (e.g., a "copper interconnect") or optical. The physical connection also includes suitable input connectors (e.g., ports, receptacles, sockets, etc.) and output connectors (e.g., plugs, pins, etc.). The NIC 1416 may include one or more dedicated processors and/or FPGAs to communicate using one or more of the aforementioned network interface protocols. In some implementations, the NIC 1416 may include multiple controllers to provide connectivity to other networks using the same or different protocols. For example, the platform 1400 may include a first NIC 1416 providing communications to the cloud over Ethernet and a second NIC 1416 providing communications to other devices over another type of network.

The computing platform 1400 may include or be coupled to acceleration circuitry 1462, which may be embodied by one or more AI accelerators, a neural compute stick, neuromorphic hardware, an FPGA, an arrangement of GPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like.

The interconnect 1406 may couple the processor circuitry 1402 to an external interface 1418 (also referred to as "I/O interface circuitry" or the like) that is used to connect external devices or subsystems. The external devices include, inter alia, sensor circuitry 1421, actuators 1422, and positioning circuitry 1445.

The sensor circuitry 1421 may include devices, modules, or subsystems whose purpose is to detect events or changes in its environment and send the information (sensor data) about the detected events to some other a device, module, subsystem, etc. Examples of such sensors 1421 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras); light detection and ranging (LiDAR) sensors; proximity sensors (e.g., infrared radiation detector and the like), depth sensors, ambient light sensors, ultrasonic transceivers; microphones; etc.

The external interface 1418 connects the platform 1400 to actuators 1422, allow platform 1400 to change its state, position, and/or orientation, or move or control a mechanism or system. The actuators 1422 comprise electrical and/or mechanical devices for moving or controlling a mechanism or system, and converts energy (e.g., electric current or moving air and/or liquid) into some kind of motion. The actuators 1422 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 1422 may include one or more electromechanical devices such as pneumatic actuators, hydraulic actuators, electromechanical switches including electromechanical relays (EMRs), motors (e.g., DC motors, stepper motors, servomechanisms, etc.), wheels, thrusters, propellers, claws, clamps, hooks, an audible sound generator, and/or other like electromechanical components. The platform 1400 may be configured to operate one or more actuators 1422 based on one or more captured events and/or instructions or control signals received from a service provider and/or various client systems.

The positioning circuitry 1445 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1445 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1445 may include a Micro-Technology for Positioning, Navigation, and Timing (Micro-PNT) IC that uses a master timing clock to perform position tracking/estimation without GNSS assistance. The positioning circuitry 1445 may also be part of, or interact with, the communication circuitry 1409 to communicate with the nodes and components of the positioning network. The positioning circuitry 1445 may also provide position data and/or time data to the application circuitry, which may use the data to synchronize operations with various infrastructure (e.g., radio base stations), for turn-by-turn navigation, or the like. When a GNSS signal is not available or when GNSS position accuracy is not sufficient for a particular application or service, a positioning augmentation technology can be used to provide augmented positioning information and data to the application or service. Such a positioning augmentation technology may include, for example, satellite based positioning augmentation (e.g., EGNOS) and/or ground based positioning augmentation (e.g., DGPS).

In some implementations, the positioning circuitry 1445 is, or includes an INS, which is a system or device that uses sensor circuitry 1421 (e.g., motion sensors such as accelerometers, rotation sensors such as gyroscopes, and altimimeters, magentic sensors, and/or the like to continuously calculate (e.g., using dead by dead reckoning, triangulation, or the like) a position, orientation, and/or velocity (including direction and speed of movement) of the platform 1400 without the need for external references.

In some examples, various I/O devices may be present within, or connected to, the platform 1400, which are referred to as input device circuitry 1486 and output device circuitry 1484 in FIG. 14. The input device circuitry 1486 and output device circuitry 1484 include one or more user interfaces designed to enable user interaction with the platform 1400 and/or peripheral component interfaces designed to enable peripheral component interaction with the platform 1400. Input device circuitry 1486 may include any physical or virtual means for accepting an input including, inter alia, one or more physical or virtual buttons (e.g., a reset button), a physical keyboard, keypad, mouse, touchpad, touchscreen, microphones, scanner, headset, and/or the like.

The output device circuitry 1484 may be included to show information or otherwise convey information, such as sensor readings, actuator position(s), or other like information. Data and/or graphics may be displayed on one or more user interface components of the output device circuitry 1484. Output device circuitry 1484 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1400. The output device circuitry 1484 may also include speakers or other audio emitting devices, printer(s), and/or the like. In some embodiments, the sensor circuitry 1421 may be used as the input device circuitry 1486 (e.g., an image capture device, motion capture device, or the like) and one or more actuators 1422 may be used as the output device circuitry 1484 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

A battery 1424 may be coupled to the platform 1400 to power the platform 1400, which may be used in embodiments where the platform 1400 is not in a fixed location. The battery 1424 may be a lithium ion battery, a lead-acid automotive battery, or a metal-air battery, such as a zinc-air battery, an aluminum-air battery, a lithium-air battery, a lithium polymer battery, and/or the like. In embodiments where the platform 1400 is mounted in a fixed location, the platform 1400 may have a power supply coupled to an electrical grid. In these embodiments, the platform 1400 may include power tee circuitry to provide for electrical power drawn from a network cable to provide both power supply and data connectivity to the platform 1400 using a single cable.

PMIC 1426 may be included in the platform 1400 to track the state of charge (SoCh) of the battery 1424, and to control charging of the platform 1400. The PMIC 1426 may be used to monitor other parameters of the battery 1424 to provide failure predictions, such as the state of health (SoH) and the state of function (SoF) of the battery 1424. The PMIC 1426 may include voltage regulators, surge protectors, power alarm detection circuitry. The power alarm detection circuitry may detect one or more of brown out (under-voltage) and surge (over-voltage) conditions. The PMIC 1426 may communicate the information on the battery 1424 to the processor circuitry 1402 over the interconnect 1406. The PMIC 1426 may also include an analog-to-digital (ADC) convertor that allows the processor circuitry 1402 to directly monitor the voltage of the battery 1424 or the current flow from the battery 1424. The battery parameters may be used to determine actions that the platform 1400 may perform, such as transmission frequency, mesh network operation, sensing frequency, and the like. As an example, the PMIC 1426 may be a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX.

A power block 1428, or other power supply coupled to a grid, may be coupled with the PMIC 1426 to charge the battery 1424. In some examples, the power block 1428 may be replaced with a wireless power receiver to obtain the power wirelessly, for example, through a loop antenna in the platform 1400. A wireless battery charging circuit, such as an LTC4020 chip from Linear Technologies of Milpitas, California, among others, may be included in the PMIC 1426. The specific charging circuits chosen depend on the size of the battery 1424, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

EXAMPLES

Illustrative examples of the technologies described throughout this disclosure are provided below. Embodiments of these technologies may include any one or more, and any combination of, the examples described below. In some embodiments, at least one of the systems or components set forth in one or more of the preceding figures may be configured to perform one or more operations, techniques, processes, and/or methods as set forth in the following examples.

Example 1 includes a network interface controller, comprising: a plurality of packet transmission queues to queue a plurality of data packets for transmission, wherein the plurality of data packets are assigned to a plurality of traffic classes; a plurality of input/output (I/O) interfaces for retrieving the plurality of data packets from a memory of a host computing system, wherein each I/O interface of the plurality of I/O interfaces is assigned to one or more of the plurality of traffic classes; scheduler circuitry to select a first data packet to be retrieved from the memory, wherein the first data packet is to be selected from the plurality of data packets; direct memory access (DMA) engine circuitry to retrieve the first data packet from the memory via one of the plurality of I/O interfaces based on a corresponding traffic class of the first data packet, wherein the DMA engine circuitry is to store the first data packet in a corresponding packet transmission queue of the plurality of packet transmission queues; and a transmission interface to transmit the first data packet over a network at a corresponding launch time indicated by the scheduler circuitry.

Example 2 includes the network interface controller of Example 1, wherein the plurality of I/O interfaces comprise: a first I/O interface for express traffic; and a second I/O interface for best-effort traffic.

Example 3 includes the network interface controller of Example 2, further comprising: a first read request queue associated with the first I/O interface, wherein the first read request queue is for express traffic; and a second read request queue associated with the second I/O interface, wherein the second read request queue is for best-effort traffic.

Example 4 includes the network interface controller of Example 1, wherein the scheduler circuitry to select the first data packet to be retrieved from the memory is further to: select the first data packet from the plurality of data packets based on the corresponding traffic class of the first data packet.

Example 5 includes the network interface controller of Example 4, wherein the scheduler circuitry to select the first data packet from the plurality of data packets based on the corresponding traffic class of the first data packet is further to: select the first data packet from the plurality of data packets based on a prefetch timer for the corresponding traffic class of the first data packet.

Example 6 includes the network interface controller of Example 5, wherein the scheduler comprises a plurality of prefetch timers for the plurality of traffic classes.

Example 7 includes the network interface controller of Example 4, wherein the scheduler circuitry comprises a mapping register to map a plurality of virtual local area networks (VLANs) to the plurality of traffic classes, wherein the plurality of VLANs are assigned to the plurality of packet transmission queues.

Example 8 includes the network interface controller of Example 1, wherein the DMA engine circuitry comprises: a descriptor DMA engine to retrieve a plurality of descriptors corresponding to the plurality of data packets; and a data DMA engine to retrieve a plurality of data payloads corresponding to the plurality of descriptors.

Example 9 includes the network interface controller of Example 8, further comprising a traffic router, wherein the traffic router comprises the plurality of I/O interfaces, and wherein the traffic router is to: route the plurality of descriptors over a first virtual channel associated with the host computing system, wherein the first virtual channel corresponds to best-effort traffic; route a first subset of the plurality of data payloads over the first virtual channel associated with the host computing system, wherein the first subset corresponds to best-effort traffic; and route a second subset of the plurality of data payloads over a second virtual channel associated with the host computing system, wherein the second subset corresponds to express traffic.

Example 10 includes at least one non-transitory machine-readable storage medium having instructions stored thereon, wherein the instructions, when executed on circuitry of a network interface controller, cause the circuitry to: select, by scheduler circuitry of the network interface controller, a first data packet to be retrieved from a memory of a host computing system, wherein the first data packet is to be selected from a plurality of data packets corresponding to a plurality of packet transmission queues of the network interface controller, wherein the plurality of data packets are assigned to a plurality of traffic classes; retrieve, by direct memory access (DMA) engine circuitry of the network interface controller, the first data packet from the memory, wherein the first data packet is to be retrieved via one of a plurality of input/output (I/O) interfaces of the network interface controller based on a corresponding traffic class of the first data packet, wherein each I/O interface of the plurality of I/O interfaces is assigned to one or more of the plurality of traffic classes; store, by the DMA engine circuitry, the first data packet in a corresponding packet transmission queue of the plurality of packet transmission queues; and transmit, via a transmission interface of the network interface controller, the first data packet over a network at a corresponding launch time indicated by the scheduler circuitry.

Example 11 includes the storage medium of Example 10, wherein the plurality of I/O interfaces comprise: a first I/O interface for express traffic; and a second I/O interface for best-effort traffic.

Example 12 includes the storage medium of Example 10, wherein the instructions that cause the scheduler circuitry to select the first data packet to be retrieved from the memory further cause the scheduler circuitry to: select the first data packet from the plurality of data packets based on the corresponding traffic class of the first data packet.

Example 13 includes the storage medium of Example 12, wherein the instructions that cause the scheduler circuitry to select the first data packet from the plurality of data packets based on the corresponding traffic class of the first data packet further cause the scheduler circuitry to: select the first data packet from the plurality of data packets based on a prefetch timer for the corresponding traffic class of the first data packet.

Example 14 includes the storage medium of Example 10, wherein the instructions further cause the circuitry to: retrieve, by a descriptor DMA engine of the DMA engine circuitry, a plurality of descriptors corresponding to the plurality of data packets; and retrieve, by a data DMA engine of the DMA engine circuitry, a plurality of data payloads corresponding to the plurality of descriptors.

Example 15 includes the storage medium of Example 14, wherein the instructions further cause the circuitry to: route, by a traffic router of the network interface controller, the plurality of descriptors over a first virtual channel associated with the host computing system, wherein the first virtual channel corresponds to best-effort traffic; route, by the traffic router, a first subset of the plurality of data payloads over the first virtual channel associated with the host computing system, wherein the first subset corresponds to best-effort traffic; and route, by the traffic router, a second subset of the plurality of data payloads over a second virtual channel associated with the host computing system, wherein the second subset corresponds to express traffic.

Example 16 includes a method performed by a network interface controller, comprising: selecting, by scheduler circuitry of the network interface controller, a first data packet to be retrieved from a memory of a host computing system, wherein the first data packet is to be selected from a plurality of data packets corresponding to a plurality of packet transmission queues of the network interface controller, wherein the plurality of data packets are assigned to a plurality of traffic classes; retrieving, by direct memory access (DMA) engine circuitry of the network interface controller, the first data packet from the memory, wherein the first data packet is to be retrieved via one of a plurality of input/output (I/O) interfaces of the network interface controller based on a corresponding traffic class of the first data packet, wherein each I/O interface of the plurality of I/O interfaces is assigned to one or more of the plurality of traffic classes; storing, by the DMA engine circuitry, the first data packet in a corresponding packet transmission queue of the plurality of packet transmission queues; and transmitting, via a transmission interface of the network interface controller, the first data packet over a network at a corresponding launch time indicated by the scheduler circuitry.

Example 17 includes the method of Example 16, wherein the plurality of I/O interfaces comprise: a first I/O interface for express traffic; and a second I/O interface for best-effort traffic.

Example 18 includes the method of Example 16, wherein selecting, by the scheduler circuitry, the first data packet to be retrieved from the memory comprises: selecting the first data packet from the plurality of data packets based on the corresponding traffic class of the first data packet.

Example 19 includes the method of Example 18, wherein selecting the first data packet from the plurality of data packets based on the corresponding traffic class of the first data packet comprises: selecting the first data packet from the plurality of data packets based on a prefetch timer for the corresponding traffic class of the first data packet.

Example 20 includes the method of Example 16, further comprising: retrieving, by a descriptor DMA engine of the DMA engine circuitry, a plurality of descriptors corresponding to the plurality of data packets; and retrieving, by a data DMA engine of the DMA engine circuitry, a plurality of data payloads corresponding to the plurality of descriptors.

Example 21 includes the method of Example 20, further comprising: routing, by a traffic router of the network interface controller, the plurality of descriptors over a first virtual channel associated with the host computing system, wherein the first virtual channel corresponds to best-effort traffic; routing, by the traffic router, a first subset of the plurality of data payloads over the first virtual channel associated with the host computing system, wherein the first subset corresponds to best-effort traffic; and routing, by the traffic router, a second subset of the plurality of data payloads over a second virtual channel associated with the host computing system, wherein the second subset corresponds to express traffic.

Example 22 includes a computing device for transmitting a plurality of data packets over a network, comprising: a host processor; a memory; and a network interface controller, comprising: a plurality of packet transmission queues to queue the plurality of data packets for transmission, wherein the plurality of data packets are assigned to a plurality of traffic classes; a plurality of input/output (I/O) interfaces for retrieving the plurality of data packets from the memory, wherein each I/O interface of the plurality of I/O interfaces is assigned to one or more of the plurality of traffic classes; scheduler circuitry to select a first data packet to be retrieved from the memory, wherein the first data packet is to be selected from the plurality of data packets; direct memory access (DMA) engine circuitry to retrieve the first data packet from the memory via one of the plurality of I/O interfaces based on a corresponding traffic class of the first data packet, wherein the DMA engine circuitry is to store the first data packet in a corresponding packet transmission queue of the plurality of packet transmission queues; and a transmission interface to transmit the first data packet over the network at a corresponding launch time indicated by the scheduler circuitry.

Example 23 includes the computing device of Example 22, wherein the plurality of I/O interfaces comprise: a first I/O interface for express traffic; and a second I/O interface for best-effort traffic.

Example 24 includes the computing device of Example 23, wherein the network interface controller further comprises: a first read request queue associated with the first I/O interface, wherein the first read request queue is for express traffic; and a second read request queue associated with the second I/O interface, wherein the second read request queue is for best-effort traffic.

Example 25 includes the computing device of Example 22, wherein the DMA engine circuitry comprises: a descriptor DMA engine to retrieve a plurality of descriptors corresponding to the plurality of data packets; and a data DMA engine to retrieve a plurality of data payloads corresponding to the plurality of descriptors.

Example 26 includes the computing device of Example 25, wherein the network interface controller further comprises a traffic router, wherein the traffic router comprises the plurality of I/O interfaces, and wherein the traffic router is to: route the plurality of descriptors over a first virtual channel associated with the computing device, wherein the first virtual channel corresponds to best-effort traffic; route a first subset of the plurality of data payloads over the first virtual channel associated with the computing device, wherein the first subset corresponds to best-effort traffic; and route a second subset of the plurality of data payloads over a second virtual channel associated with the computing device, wherein the second subset corresponds to express traffic.

Example 27 includes an apparatus comprising means to implement the method of any of Examples 16-21.

Example 28 includes an apparatus comprising logic, modules, or circuitry to implement the method of any of Examples 16-21.

Example 29 includes one or more non-transitory computer-readable media comprising instructions to cause an electronic device, upon execution of the instructions by one or more processors of the electronic device, to implement the method of any of Examples 16-21.

Example 30 includes an apparatus comprising: one or more processors and one or more computer-readable media comprising instructions that, when executed by the one or more processors, cause the one or more processors to implement the method of any of Examples 16-21.

Example 31 includes a computer program comprising instructions, wherein execution of the program by a processing element is to cause the processing element to implement the method of any of Examples 16-21.

Example 32 includes a mobile device comprising circuitry to implement the method of any of Examples 16-21.

Example 33 includes a user equipment device comprising circuitry to implement the method of any of Examples 16-21.

Example 34 includes a client computing device or end user device comprising circuitry to implement the method of any of Examples 16-21.

Example 35 includes a media streaming device or server comprising circuitry to implement the method of any of Examples 16-21.

Example 36 includes a content delivery server or network comprising circuitry to implement the method of any of Examples 16-21.

Example 37 includes a wireless communication system comprising nodes to implement the method of any of Examples 16-21.

Example 38 includes an access point to implement the method of any of Examples 16-21.

Example 39 includes a base station to implement the method of any of Examples 16-21.

Example 40 includes a cloud computing system, cloud server, or cloud node comprising circuitry to implement the method of any of Examples 16-21.

Example 41 includes an edge computing system, edge server, or edge node comprising circuitry to implement the method of any of Examples 16-21.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A network interface controller, comprising:
   memory circuitry to store a plurality of packet transmission queues, wherein the packet transmission queues are to queue a plurality of data packets for transmission, wherein the plurality of data packets are assigned to a plurality of traffic classes;
   a traffic router, wherein the traffic router comprises a plurality of input/output (I/O) interfaces for retrieving the plurality of data packets from a memory of a host computing system, wherein each I/O interface of the plurality of I/O interfaces is assigned to one or more of the plurality of traffic classes, wherein the traffic router is to:
      route a plurality of descriptors over a first virtual channel associated with the host computing system, wherein the plurality of descriptors correspond to the plurality of data packets, and wherein the first virtual channel corresponds to best-effort traffic;
      route a first subset of a plurality of data payloads over the first virtual channel, wherein the plurality of data payloads correspond to the plurality of descriptors, and wherein the first subset corresponds to best-effort traffic; and
      route a second subset of the plurality of data payloads over a second virtual channel associated with the host computing system, wherein the second subset corresponds to express traffic;
   scheduler circuitry to select a first data packet to be retrieved from the memory, wherein the first data packet is to be selected from the plurality of data packets;
   direct memory access (DMA) engine circuitry to retrieve the first data packet from the memory via one of the plurality of I/O interfaces based on a corresponding traffic class of the first data packet, wherein the DMA engine circuitry is to store the first data packet in a corresponding packet transmission queue of the plurality of packet transmission queues, wherein the DMA engine circuitry comprises:
      a descriptor DMA engine to retrieve the plurality of descriptors; and
      a data DMA engine to retrieve the plurality of data payloads; and
   a transmission interface to transmit the first data packet over a network at a corresponding launch time indicated by the scheduler circuitry.

2. The network interface controller of claim 1, wherein the plurality of I/O interfaces comprise:
   a first I/O interface for express traffic; and
   a second I/O interface for best-effort traffic.

3. The network interface controller of claim 2, wherein the memory circuitry is further to store:
   a first read request queue associated with the first I/O interface, wherein the first read request queue is for express traffic; and
   a second read request queue associated with the second I/O interface, wherein the second read request queue is for best-effort traffic.

4. The network interface controller of claim 1, wherein the scheduler circuitry to select the first data packet to be retrieved from the memory is further to:
   select the first data packet from the plurality of data packets based on the corresponding traffic class of the first data packet.

5. The network interface controller of claim 4, wherein the scheduler circuitry to select the first data packet from the plurality of data packets based on the corresponding traffic class of the first data packet is further to:
   select the first data packet from the plurality of data packets based on a prefetch timer for the corresponding traffic class of the first data packet.

6. The network interface controller of claim 5, wherein the scheduler comprises a plurality of prefetch timers for the plurality of traffic classes.

7. The network interface controller of claim 4, wherein the scheduler circuitry comprises a mapping register to map a plurality of virtual local area networks (VLANs) to the plurality of traffic classes, wherein the plurality of VLANs are assigned to the plurality of packet transmission queues.

8. At least one non-transitory machine-readable storage medium having instructions stored thereon, wherein the instructions, when executed on circuitry of a network interface controller, cause the circuitry to:
   retrieve, by a descriptor direct memory access (DMA) engine of DMA engine circuitry of the network interface controller, a plurality of descriptors corresponding to a plurality of data packets;
   retrieve, by a data DMA engine of the DMA engine circuitry, a plurality of data payloads corresponding to the plurality of descriptors;
   route, by a traffic router of the network interface controller, the plurality of descriptors over a first virtual channel associated with a host computing system, wherein the first virtual channel corresponds to best-effort traffic;
   route, by the traffic router, a first subset of the plurality of data payloads over the first virtual channel, wherein the first subset corresponds to best-effort traffic;
   route, by the traffic router, a second subset of the plurality of data payloads over a second virtual channel associated with the host computing system, wherein the second subset corresponds to express traffic;
   select, by scheduler circuitry of the network interface controller, a first data packet to be retrieved from a memory of the host computing system, wherein the first data packet is to be selected from the plurality of data packets, wherein the plurality of data packets correspond to a plurality of packet transmission queues of the network interface controller, and wherein the plurality of data packets are assigned to a plurality of traffic classes;
   retrieve, by the DMA engine circuitry, the first data packet from the memory, wherein the first data packet is to be retrieved via one of a plurality of input/output (I/O) interfaces of the network interface controller based on a corresponding traffic class of the first data packet, wherein each I/O interface of the plurality of I/O interfaces is assigned to one or more of the plurality of traffic classes;
   store, by the DMA engine circuitry, the first data packet in a corresponding packet transmission queue of the plurality of packet transmission queues; and transmit, via a transmission interface of the network interface controller, the first data packet over a network at a corresponding launch time indicated by the scheduler circuitry.

9. The storage medium of claim 8, wherein the plurality of I/O interfaces comprise:
   a first I/O interface for express traffic; and
   a second I/O interface for best-effort traffic.

10. The storage medium of claim 8, wherein the instructions that cause the scheduler circuitry to select the first data packet to be retrieved from the memory further cause the scheduler circuitry to:
   select the first data packet from the plurality of data packets based on the corresponding traffic class of the first data packet.

11. The storage medium of claim 10, wherein the instructions that cause the scheduler circuitry to select the first data packet from the plurality of data packets based on the corresponding traffic class of the first data packet further cause the scheduler circuitry to:
   select the first data packet from the plurality of data packets based on a prefetch timer for the corresponding traffic class of the first data packet.

12. A method performed by a network interface controller, comprising:
   retrieving, by a descriptor direct memory access (DMA) engine of DMA engine circuitry of the network interface controller, a plurality of descriptors corresponding to a plurality of data packets;
   retrieving, by a data DMA engine of the DMA engine circuitry, a plurality of data payloads corresponding to the plurality of descriptors;
   routing, by a traffic router of the network interface controller, the plurality of descriptors over a first virtual channel associated with a host computing system, wherein the first virtual channel corresponds to best-effort traffic;
   routing, by the traffic router, a first subset of the plurality of data payloads over the first virtual channel, wherein the first subset corresponds to best-effort traffic;
   routing, by the traffic router, a second subset of the plurality of data payloads over a second virtual channel associated with the host computing system, wherein the second subset corresponds to express traffic;
   selecting, by scheduler circuitry of the network interface controller, a first data packet to be retrieved from a memory of the host computing system, wherein the first data packet is to be selected from the plurality of data packets, wherein the plurality of data packets correspond to a plurality of packet transmission queues of the network interface controller, and wherein the plurality of data packets are assigned to a plurality of traffic classes;
   retrieving, by the DMA engine circuitry, the first data packet from the memory, wherein the first data packet is to be retrieved via one of a plurality of input/output (I/O) interfaces of the network interface controller based on a corresponding traffic class of the first data packet, wherein each I/O interface of the plurality of I/O interfaces is assigned to one or more of the plurality of traffic classes;
   storing, by the DMA engine circuitry, the first data packet in a corresponding packet transmission queue of the plurality of packet transmission queues; and
   transmitting, via a transmission interface of the network interface controller, the first data packet over a network at a corresponding launch time indicated by the scheduler circuitry.

13. The method of claim 12, wherein the plurality of I/O interfaces comprise:
   a first I/O interface for express traffic; and
   a second I/O interface for best-effort traffic.

14. The method of claim 12, wherein selecting, by the scheduler circuitry, the first data packet to be retrieved from the memory comprises:
   selecting the first data packet from the plurality of data packets based on the corresponding traffic class of the first data packet.

15. A computing device for transmitting a plurality of data packets over a network, comprising:
   a host processor;
   a memory; and
   a network interface controller, comprising:
      memory circuitry to store a plurality of packet transmission queues, wherein the packet transmission queues are to queue the plurality of data packets for transmission, wherein the plurality of data packets are assigned to a plurality of traffic classes;
      a traffic router, wherein the traffic router comprises a plurality of input/output (I/O) interfaces for retrieving the plurality of data packets from the memory, wherein each I/O interface of the plurality of I/O interfaces is assigned to one or more of the plurality of traffic classes, wherein the traffic router is to:
         route a plurality of descriptors over a first virtual channel associated with the computing device, wherein the plurality of descriptors correspond to the plurality of data packets, and wherein the first virtual channel corresponds to best-effort traffic;
         route a first subset of a plurality of data payloads over the first virtual channel, wherein the plurality of data payloads correspond to the plurality of descriptors, and wherein the first subset corresponds to best-effort traffic; and
         route a second subset of the plurality of data payloads over a second virtual channel associated with the computing device, wherein the second subset corresponds to express traffic;
      scheduler circuitry to select a first data packet to be retrieved from the memory, wherein the first data packet is to be selected from the plurality of data packets;
      direct memory access (DMA) engine circuitry to retrieve the first data packet from the memory via one of the plurality of I/O interfaces based on a corresponding traffic class of the first data packet, wherein the DMA engine circuitry is to store the first data packet in a corresponding packet transmission queue of the plurality of packet transmission queues, wherein the DMA engine circuitry comprises:
         a descriptor DMA engine to retrieve the plurality of descriptors; and
         a data DMA engine to retrieve the plurality of data payloads; and
      a transmission interface to transmit the first data packet over the network at a corresponding launch time indicated by the scheduler circuitry.

16. The computing device of claim 15, wherein the plurality of I/O interfaces comprise:
   a first I/O interface for express traffic; and
   a second I/O interface for best-effort traffic.

17. The computing device of claim 16, wherein the memory circuitry is further to store:
- a first read request queue associated with the first I/O interface, wherein the first read request queue is for express traffic; and
- a second read request queue associated with the second I/O interface, wherein the second read request queue is for best-effort traffic.

18. A network interface controller, comprising:
- direct memory access (DMA) circuitry, wherein the DMA circuitry comprises:
  - a first DMA engine to read a plurality of DMA descriptors from a memory, wherein the DMA descriptors correspond to a plurality of packet payloads for a plurality of packets;
  - a second DMA engine to read the packet payloads from the memory; and
  - memory circuitry to store:
    - a first read request queue for the DMA descriptors; and
    - a second read request queue for the packet payloads; and
- media access control (MAC) circuitry to transmit the packets over a network.

\* \* \* \* \*